US011505038B2

(12) United States Patent
Kim et al.

(10) Patent No.: US 11,505,038 B2
(45) Date of Patent: Nov. 22, 2022

(54) HEAT PUMP SYSTEM FOR VEHICLE

(71) Applicants: HYUNDAI MOTOR COMPANY, Seoul (KR); KIA MOTORS CORPORATION, Seoul (KR)

(72) Inventors: Jae Yeon Kim, Hwaseong-si (KR); Yeonho Kim, Seoul (KR); Jeawan Kim, Gwangmyeong-si (KR); Su Whan Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 87 days.

(21) Appl. No.: 17/210,217

(22) Filed: Mar. 23, 2021

(65) Prior Publication Data

US 2022/0032736 A1 Feb. 3, 2022

(30) Foreign Application Priority Data

Aug. 3, 2020 (KR) ........................ 10-2020-0096633

(51) Int. Cl.
*F25B 13/00* (2006.01)
*B60H 1/32* (2006.01)
*B60H 1/00* (2006.01)

(52) U.S. Cl.
CPC ....... *B60H 1/3205* (2013.01); *B60H 1/00278* (2013.01)

(58) Field of Classification Search
CPC .......................... B60H 1/3205; B60H 1/00278
USPC ........................................................... 62/160
See application file for complete search history.

(56) References Cited

U.S. PATENT DOCUMENTS

| | | | | |
|---|---|---|---|---|
| 6,705,101 | B2 | 3/2004 | Brotz et al. | |
| 8,215,432 | B2 | 7/2012 | Nemesh et al. | |
| 8,899,062 | B2 | 12/2014 | Kadle et al. | |
| 9,109,840 | B2 | 8/2015 | Kadle et al. | |
| 9,239,193 | B2 | 1/2016 | Kadle et al. | |
| 2013/0283838 | A1 | 10/2013 | Kadle et al. | |
| 2017/0096044 | A1* | 4/2017 | Kim | B60H 1/2218 |
| 2018/0312035 | A1* | 11/2018 | Koberstein | B60H 1/00899 |
| 2020/0047591 | A1* | 2/2020 | He | B60H 1/32284 |

FOREIGN PATENT DOCUMENTS

| | | | |
|---|---|---|---|
| CN | 103380339 | B | 1/2016 |
| JP | 5336033 | B2 | 11/2013 |

* cited by examiner

*Primary Examiner* — Davis D Hwu
(74) *Attorney, Agent, or Firm* — McDonnell Boehnen Hulbert & Berghoff LLP

(57) ABSTRACT

Disclosed is a heat pump system for a vehicle, providing for selective heat-exchanging heat energy generated from a coolant with a coolant upon condensing and evaporation of the coolant to control an internal temperature of the vehicle using the heat-exchanged coolant of a low temperature or a high temperature. The heat pump system adjusts a temperature of a battery module by using one chiller that performs heat exchange between a refrigerant and a coolant and improves the heating efficiency of the vehicle using a waste heat of an electrical component and a battery module.

20 Claims, 8 Drawing Sheets

HEAT PUMP SYSTEM FOR VEHICLE

CROSS-REFERENCE TO RELATED APPLICATION

This application claims priority to and the benefit of Korean Patent Application No. 10-2020-0096633 filed in the Korean Intellectual Property Office on Aug. 3, 2020, the entire contents of which are incorporated herein by reference.

BACKGROUND

(a) Field

The present disclosure relates to a heat pump system for a vehicle. More particularly, the present disclosure relates to a heat pump system for a vehicle for cooling or heating an inside of the vehicle selectively using a coolant of a high temperature or a coolant of a low temperature.

(b) Description of the Related Art

In general, an air conditioner for a vehicle includes an air conditioning system for circulating a coolant in order to heat or cool an inside of the vehicle.

Such an air conditioner maintains a comfortable indoor environment by maintaining an interior temperature of the vehicle at an appropriate level regardless of an external temperature change, so that the interior of the vehicle is warmed or cooled through heat exchange by a condenser and an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured to substantially replace internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is generally referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle generally, a battery cooling system needs to be separately formed with a separate sealing circuit together with a cooler and the heat pump system to prevent the heat generation in the motor and electrical components, and the battery including the fuel cell.

Accordingly, the size and weight of a cooling module disposed in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, multiple valves for connection with the respective connection pipes are adopted and noise and vibration due to frequent opening and closing operations of the valves are transferred to the internal of the vehicle to degrade ride comfort.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a heat pump system for a vehicle having advantages of selectively heat-exchanging heat energy generated from a coolant with a coolant upon condensing and evaporation of the coolant to control an internal temperature of the vehicle using the heat-exchanged coolant of a low temperature or a high temperature.

An exemplary embodiment of the present disclosure provides a heat pump system for a vehicle, which adjusts a temperature of a battery module by using one chiller that performs heat exchange between a refrigerant and a coolant and improves the heating efficiency of the vehicle using a waste heat of an electrical component and a battery module.

A heat pump system for a vehicle including: a cooling apparatus configured to include a radiator, a first water pump, a first valve, a second valve, and a reservoir tank which are connected through a coolant line, and to circulate a coolant in the coolant line to cool at least one electrical component provided in the coolant line; a battery cooling apparatus configured to include a battery coolant line connected to the coolant line through the first valve, and a second water pump and a battery module which are connected through the battery coolant line to circulate the coolant in the battery module, a chiller provided in the battery coolant line between the first valve and the battery module, through which a refrigerant passes, to adjust a temperature of the coolant by performing heat exchange between the coolant that is selectively introduced into the battery coolant line and a refrigerant, a heating apparatus including a heating line selectively connected to the coolant line through the second valve to heat a vehicle interior by using a coolant, and a third water pump and a heater provided on the heating line, an air conditioner including a cooling line selectively connected to the battery coolant line through a third valve to cool the interior of the vehicle by using a coolant, and a fourth water pump and a cooler provided in the cooling line; and a centralized energy device connected to the heating and cooling lines in order to supply a coolant of a high temperature to the heating apparatus, and to supply a coolant of a low temperature to the an air conditioner, and selectively heat-exchanging heat energy generated upon condensing and evaporation of a refrigerant circulating an inside with each coolant supplied through the heating and cooling lines, and supplying a refrigerant to chiller, a branch line having a first end connected to the coolant line between the radiator and the second valve, and a second end connected to the first valve, and a chiller connection line connecting the chiller and the first valve separately from the battery coolant line.

The first valve may include: a first port connected to the coolant line connected to the reservoir tank, a second port connected to the coolant line connected the first water pump, a third port connected to the chiller connection line; a fourth port connected to the branch line, a fifth port connected to the battery coolant line connected to the chiller, and a sixth port connected to the battery coolant line connected to the second water pump.

The first valve may be operated to discharge the coolant through a port adjacent to a port into which coolant is introduced among the first to sixth ports.

The reservoir tank may be provided in the coolant line between the radiator and the first valve, and may be connected to the coolant line connecting the first valve and the first water pump through a supply line.

The heater and the cooler may be provided inside an HVAC module, and the HVAC module may include an opening and closing door provided between the heater and the cooler and configured to control outside air passing through the cooler to be selectively introduced into the heater depending on cooling, heating, and heating and dehumidifying modes of the vehicle therein.

The HVAC module may further include an air heater provided at an opposite side of the cooler, with the heater interposed therebetween to selectively heat outside air passing through the heater.

The air heater may be operated to raise a temperature of the outside air passing through the heater when a temperature of a coolant supplied to the heater is lower than a target temperature for interior heating.

The centralized energy device may include: a condenser that circulates a refrigerant therein, is provided in the heating line between the second valve and the heater, condenses the refrigerant through heat-exchange between the refrigerant and the coolant, and increases a temperature of the coolant, an expansion valve connected to the condenser through the refrigerant line, an evaporator that is connected to the expansion valve through the refrigerant line, is provided on the cooling line between the third valve and the cooler, evaporates the refrigerant through heat-exchange between the refrigerant and the coolant, and lowers a temperature of the coolant, a compressor that is provided on the refrigerant line between the evaporator and the condenser, and an accumulator that is provided on the refrigerant line between the evaporator and the compressor. The chiller may be provided on the refrigerant line between the evaporator and the accumulator.

In the heating mode of the vehicle, the condenser may condense the refrigerant by heat-exchanging between the coolant circulating the heating line and the high-temperature refrigerant supplied from the compressor, and may supply a high-temperature coolant to heater through the heating line.

In the cooling mode of the vehicle, the evaporator may heat-exchange a coolant circulating the cooling line with an internally evaporated refrigerant of a low temperature to cool the coolant, and may supply a low-temperature coolant to cooler through the cooling line.

An internal heat exchanger may be provided in the refrigerant line between evaporator and the compressor.

The refrigerant line that connects the condenser and the expansion valve and the refrigerant line that connects the evaporator and the compressor may be respectively connected to the internal heat exchanger, and the internal heat exchanger may additionally condense the refrigerant condensed by the condenser through heat-exchange with a low-temperature refrigerant discharged from the evaporator, and the additionally condensed refrigerant may be introduced into the expansion valve.

When the battery module is cooled in the cooling mode of the vehicle, in the cooling apparatus, the coolant may be circulated in the coolant line by the operation of the first water pump. The branch line and the chiller connection line may be closed through the operation of the first valve. The coolant line and the battery coolant line may form an independent closed circuits through the operation of the first valve; in the battery cooling apparatus, the coolant passing through the chiller may be supplied to the battery module along the battery coolant line through the operation of the second water pump; in the heating apparatus, the coolant line and the heating line may be connected through the operation of the second valve so that the coolant is supplied from the cooling apparatus. The coolant may be circulated along the heating line through an operation of the third water pump; in the air conditioner, the cooling line may form an independent closed circuit that is independent of the battery coolant line through an operation of the third valve, respectively. The coolant may be circulated along the cooling line through an operation of the fourth water pump, and a coolant passing through the evaporator may be supplied to the cooler, and in the centralized energy device, each constituent element may operate such that the refrigerant is circulated along the refrigerant line.

The coolant circulating the heating apparatus may be supplied to the condenser along the heating line so that the condenser condenses the refrigerant through heat-exchange with the coolant, and the coolant circulating the air conditioner may be supplied to the evaporator along the cooling line so that the evaporator evaporates the refrigerant through heat-exchange with the coolant.

When recovering the waste heat of the electrical component in a heating mode of the vehicle, the branch line and the chiller connection line may be opened through the operation of the first valve. In the cooling apparatus, on the basis of the branch line, a portion of the coolant lines respectively connected to the radiator and the reservoir tank may be closed, and the coolant passing through the electrical component may circulate along the opened branch line and an opened portion of the coolant line without passage through the radiator through the operation of the first water pump, the coolant introduced into the first valve through the branch line may be introduced into the chiller along a portion of the battery coolant line connecting the chiller and the first valve, the coolant passing through the chiller may be introduced into the first valve along the opened chiller connection line, and then may be circulated in the coolant line connected to the electrical component through the first valve, the coolant line and the heating line may form an independent closed circuits through the operation of the second valve, respectively. In the heating apparatus, the coolant may circulate along the heating line through the operation of the third water pump, the battery cooling apparatus and the air conditioner may be deactivated, and in the centralized energy device, each constituent element operates such that the refrigerant is circulated along the refrigerant line.

When performing a low temperature dehumidification mode of the vehicle, the branch line and the chiller connection line may be opened through the operation of the first valve.

In the cooling apparatus, on the basis of the branch line, a portion of the coolant lines respectively connected to the radiator and the reservoir tank may be closed, and the coolant passing through the electrical component may circulate along the opened branch line and an opened portion of the coolant line without passage through the radiator through the operation of the first water pump, the coolant introduced into the first valve through the branch line may be introduced into the chiller along a portion of the battery coolant line connecting the chiller and the first valve, the coolant passing through the chiller may be introduced into the first valve along the opened chiller connection line, and then may be circulated in the coolant line connected to the electrical component through the first valve; the battery cooling apparatus may be deactivated, the coolant line and the heating line may form an independent closed circuits through the operation of the second valve, respectively; in the heating apparatus, the coolant may circulate along the heating line through the operation of the third water pump; in the centralized energy device, each constituent element may operate such that the refrigerant is circulated along the refrigerant line; and in the air conditioner, the coolant may be circulated along the cooling line through an operation of the fourth water pump In a state in which the connection with the battery coolant line is closed.

When in a high temperature dehumidification mode of the vehicle, the branch line and the chiller connection line may be closed through the operation of the first valve; in the cooling apparatus, the coolant may be circulated in the coolant line by the operation of the first water pump; the battery coolant apparatus may be deactivated; in the heating apparatus, the coolant line and the heating line may be connected through an operation of the second valve such that the coolant is supplied from the cooling apparatus, and the coolant may be circulated along the heating line through an operation of the third water pump; in the centralized energy device, each constituent element operates such that the refrigerant may be circulated along the refrigerant line. In the air conditioner, the coolant may be circulated along the cooling line through an operation of the fourth water pump. In a state in which the connection with the battery coolant line is closed.

When cooling the electrical component and the battery module by using the coolant, the branch line may be closed through the operation of the first valve. The chiller connection line may be opened through the operation of the first valve, a portion of the battery coolant line connecting the chiller and the first valve may be closed through the operation of the first valve, the coolant line connecting the reservoir tank and the first valve may be connected to the battery coolant line through the operation of the first valve, the coolant cooled in the radiator and stored in the reservoir tank may be supplied to the electrical component through an operation of the first water pump, the coolant cooled in the radiator may pass through the battery module along the battery coolant line from the first valve through the operation of the first and second water pumps, and the coolant passing through the battery module may be introduced from the chiller to the first valve along the opened chiller connection line, and then may be supplied to the electrical component while flowing along the coolant line connected to the first water pump.

When using the waste heat of the electrical component without an operation of the centralized energy device in the heating mode of the vehicle, the branch line and the chiller connection line may be opened through the operation of the first valve; in the cooling apparatus, on the basis of the branch line, the coolant line connected to the radiator, the reservoir tank, and the first valve may be closed. The battery coolant line except for the battery coolant line connected to the chiller may be closed through the operation of the first valve; in the heating apparatus, the heating line may be connected to the coolant line through the operation of the second valve. The coolant having the temperature that has risen while passing through the electrical component by the operation of the first water pump may be supplied to the heating line connected to the opened coolant line without passing through the radiator; the coolant introduced into the heating line may be supplied to the heater through the operation of the third water pump; the coolant discharged from the heater may be introduced into the first valve along the opened coolant line and the opened branch line; the coolant introduced into the first valve may be again introduced into the first valve along the opened chiller connection line after passing through the chiller along the opened portion of the battery coolant line; and the coolant again introduced into the first valve may be supplied to the electrical component along the opened the coolant line.

The first valve may be a 6-way valve, and the second and third valves may be a 4-way valve.

The electrical component may include an electric power control unit (EPCU), or a motor, or an inverter, or an autonomous driving controller, or an on board charger (OBC).

The reservoir tank may be provided in the coolant line between the radiator and the first valve, and may be connected to the coolant line connecting the first valve and the first water pump through a supply line, and the supply line may be connected to the coolant line when the coolant is circulated to the coolant line by the operation of the first water pump.

The battery cooling apparatus may further include a first coolant heater provided in the battery coolant line between the battery module and the chiller.

When the battery module is heated, the first coolant heater may be operated to heat a coolant supplied to the battery module along the battery coolant line.

The heating apparatus may include a second coolant heater provided in the heating line between the third water pump and the heater.

The second coolant heater may be operated when the temperature of the coolant supplied to the heater is lower than a target temperature.

The chiller, the condenser, and the evaporator may be a water-cooled heat exchanger into which a coolant flows.

A refrigerant that circulates in the centralized energy device may be an R152-a, R744, or R290 refrigerant.

As described above, in the heat pump system for a vehicle according to an exemplary embodiment of the present disclosure, a system may be simplified and a layout of connection pipes in which a coolant circulates may be simplified by selectively heat-exchanging heat energy generated from a refrigerant with a coolant upon condensation and evaporation of the refrigerant to control an internal temperature of the vehicle using the heat-exchanged coolant of a low temperature or a high temperature.

According to the present disclosure, the temperature of the battery module may be adjusted depending on the mode of the vehicle by using one chiller for performing heat exchange between the coolant and the refrigerant, and the interior of the vehicle may be cooled and heated by using the coolant, thereby simplifying the entire system.

Further, the present disclosure may improve heating efficiency of the vehicle using waste heat of electrical components and a battery module, and may increase the whole travel distance of the vehicle through efficient temperature control of a battery module in order to obtain optimal performance of the battery module.

Moreover, the present disclosure may reduce a size and a weight by packaging a centralized energy module for generating heat energy through condensation and evaporation of a refrigerant, and may prevent noise, vibration, and operational instability from being generated as compared with an air conditioner according to the related art by using a high performance refrigerant.

In addition, according to the present disclosure can use the coolant heater applied to the heating apparatus can be used to assist in an interior heating of the vehicle, thereby reducing the cost and weight.

In addition, through the simplification of the entire system, a reduction in production cost and weight is possible, and space utilization may be improved.

DETAILED DESCRIPTION

Figure 1:
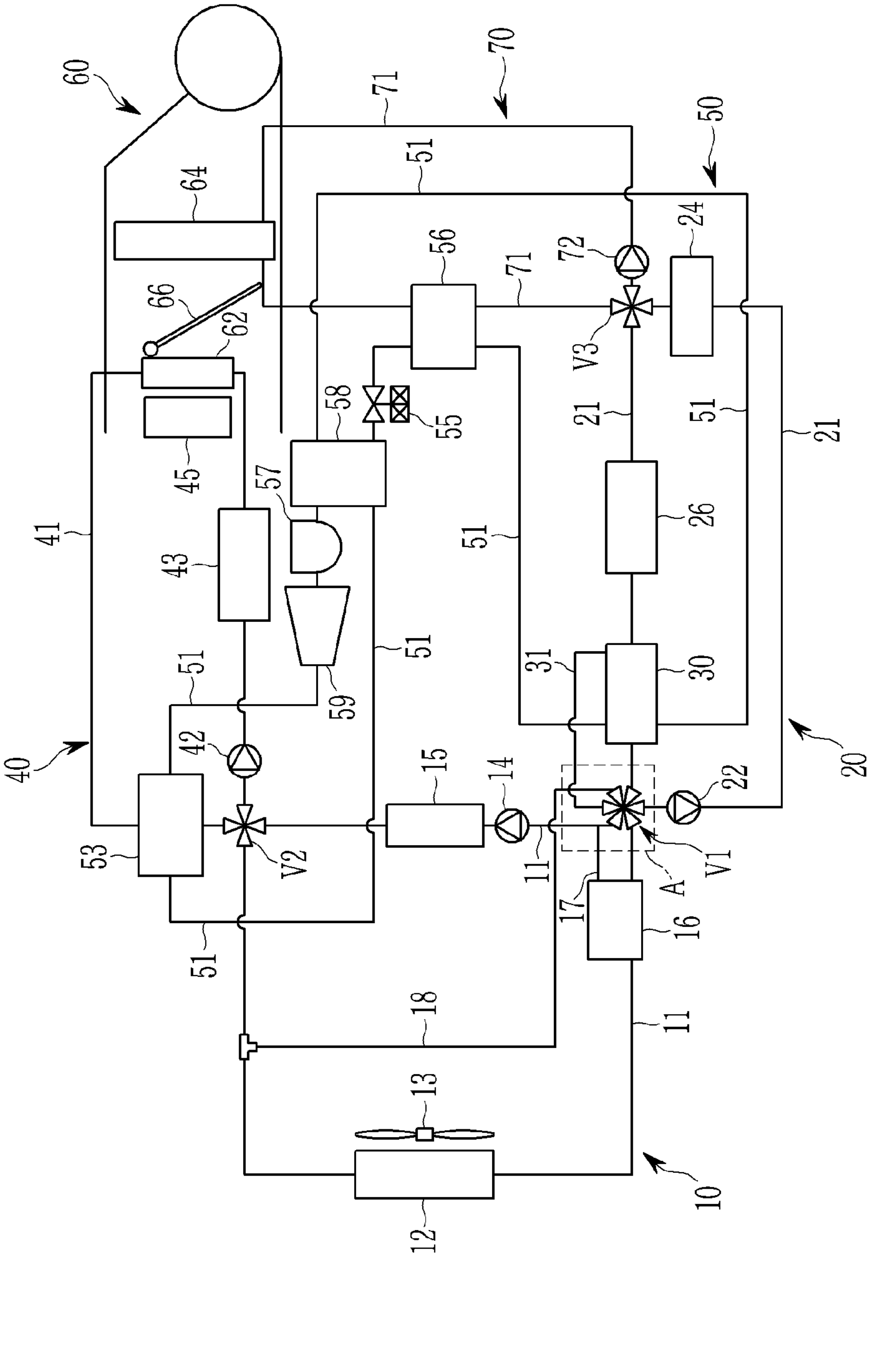
FIG. 1 illustrates a block diagram of a heat pump system for a vehicle according to an exemplary embodiment of the present disclosure.

An exemplary embodiment of the present disclosure will hereinafter be described in detail with reference to the accompanying drawings.

Exemplary embodiments described in the present specification and configurations shown in the drawings are just the most preferable exemplary embodiments of the present disclosure, but do not limit the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to by the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, "... unit", "... mechanism", "... portion", "... member", etc. used herein mean a unit of inclusive components performing at least one or more functions or operations.

Figure 2:
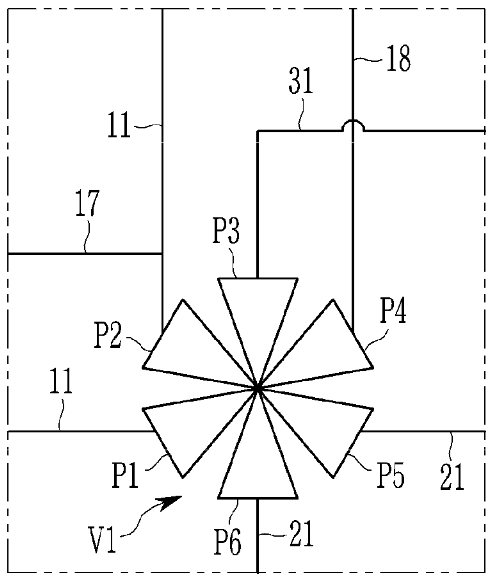
FIG. 2 is an enlarged view of part A of FIG. 1.

FIG. 1 is a block diagram of a heat pump system for a vehicle according to an exemplary embodiment of the present disclosure, and FIG. 2 is an enlarged view of part A of FIG. 1.

A heat pump system for a vehicle according to an exemplary embodiment of the present disclosure selectively exchanges thermal energy generated from a refrigerant in condensation and evaporation with a coolant to perform a cooling mode or a heating mode of the vehicle by using only a low-temperature or high-temperature coolant.

The heat pump system for the vehicle may adjust a temperature of a battery module 24 by using one chiller 30 in which a refrigerant and a coolant are heat-exchanged, and uses waste heat of an electrical component 15 and the battery module 24, thereby improving heating efficiency.

The heat pump system is applicable to hybrid vehicles or electric vehicles.

Here, in the heat pump system for the electric vehicle, a cooling apparatus 10, a battery cooling apparatus 20, a heating apparatus 40, a centralized energy device 50 that exchanges a coolant and a refrigerant while circulating a refrigerant, and an air conditioner 70 may be mutually interconnected.

Referring to FIG. 1, the heat pump system includes the cooling apparatus 10, the battery cooling apparatus 20, the heating apparatus 40, the centralized energy device 50, and the air conditioner 70.

First, the cooling apparatus 10 includes a radiator 12 connected to a coolant line 11, a first water pump 14, a first valve V1, a second valve V2, and a reservoir tank 16.

The first radiator 12 is disposed forward in a vehicle, and a cooling fan 13 is provided at a rear of the first radiator 12 to cool the coolant through heat-exchange with an ambient air, e.g., by the operation of the cooling fan 13.

In addition, the electrical component 15 may include an electric power control unit (EPCU), or a motor, or an inverter, or an autonomous driving controller, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, or the motor, or the inverter, or the autonomous driving controller, or the OBC may be recovered.

Also, the reservoir tank 16 is provided on the coolant line 11 between the radiator 12 and the first water pump 14. The coolant cooled in the radiator 12 may be stored in the reservoir tank 16.

This cooling apparatus 10 may circulate the coolant in the coolant line 11 through the operation of the first water pump 14 such that the coolant is supplied to the electrical component 15 provided in the coolant line 11.

Meanwhile, the reservoir tank 16 may be connected to the coolant line 11 connecting the first valve V1 and the first water pump 14 through a supply line 17.

The supply line 17 may be connected to the coolant line 11 when the coolant is circulated to the coolant line 11 by the operation of the first water pump 14.

That is, when the first water pump 14 is operated, the reservoir tank 16 may always flow a portion of the stored coolant into the coolant line 11 through the supply line 17.

Accordingly, when the first water pump 14 is operated, the occurrence of cavitation in the first water pump 14 can be prevented. In addition, a damage of the first water pump 14 due to the cavitation can be prevented in advance.

In addition, the cooling apparatus 10 may further include a branch line 18.

A first end of the branch line 18 is connected to the coolant line 11 between the radiator 12 and the second valve V2. A second end of the branch line 18 may be connected to the first valve V1.

When the waste heat of the electrical component 15 is recovered, the branch line 18 may be selectively opened and closed through the operation of the first valve V1 so that the coolant that has passed through the electric equipment 15 is supplied back into the electric equipment 15 without passing through the radiator 12.

In the present exemplary embodiment, the battery cooling apparatus 20 includes a battery coolant line 21 connected to the coolant line 11 through the first valve V1, and a second water pump 22 and the battery module 24 connected to the battery coolant line 21.

The battery cooling apparatus 20 may selectively circulate the coolant in the battery module 24 through an operation of the second water pump 22.

Meanwhile, the battery module 24 may be formed as a water-cooled type that supplies power to the electrical component 15, and is cooled by a coolant flowing along the battery coolant line 21.

Here, the first and second water pumps 14 and 22 may be electric water pumps.

Meanwhile, the battery cooling apparatus 20 may further include a first coolant heater 26 provided in the battery coolant line 21 between the battery module 24 and the first valve V1.

When it is required to increase the temperature of the battery module 24, the first coolant heater 26 is turned on to heat the coolant circulated in the battery coolant line 21 such that the coolant of which temperature is increased may be supplied to the battery module 24.

The first coolant heater 26 may be an electric heater that operates according to supply of electric power.

That is, the first coolant heater 26 is operated when the temperature of the coolant supplied to the battery module 24 is lower than the target temperature, so that the coolant circulating in the battery coolant line 21 may be heated.

Accordingly, the coolant having an increased temperature while passing through the first coolant heater 26 may be supplied to the battery module 24, to raise the temperature of the battery module 24.

That is, the first coolant heater 26 may selectively operate when the temperature of the battery module 24 is raised.

In the present exemplary embodiment, the chiller 30 is provided in the battery coolant line 21 between the first valve V1 and the battery module 24.

The chiller 30 is connected to a refrigerant line 51 of the centralized energy device 50 such that the refrigerant is passed through. That is, the chiller 30 may be a water-cooled heat exchanger into which a coolant flows.

Herein, the chiller 30 may be connected to the first valve V1 through a chiller connection line 31.

That is, the chiller connection line 31 may connect the chiller 30 and the first valve V1 separately from the battery coolant line 21 by the operation of the first valve V1.

Accordingly, the chiller 30 may regulate the temperature of the coolant by performing heat exchange between the coolant that is selectively supplied to the battery coolant line 21 and the chiller connection line 31, and the refrigerant that is selectively supplied from the centralized energy device 50.

Herein, a first end of the chiller connection line 31 is connected to the first valve V1. A second end of the chiller connection line 31 may be connected to the chiller 30.

The chiller connection line 31 may connect the chiller 30 to the first valve V1 according to the operation of the first valve V1.

Additionally, the heating apparatus 40 may include a heating line 41 connected to the coolant line 11 through a second valve V2, and a third water pump 42 and a heater 62 provided in the heating line 41 so as to heat an inside of the vehicle by using the coolant.

When an interior of the vehicle is heated, the heating device 40 may connect the coolant line 11 and the heating line 41 connected to the electrical component 15 by the operation of the second valve V2 such that the high-temperature coolant that has passed through the electrical component 15 is supplied to the heating line 41.

Accordingly, the high-temperature coolant may be supplied to the heater 62 along the heating line 41.

That is, the heating apparatus 40 constructed as described above supplies the high temperature coolant introduced from the cooling apparatus 10 to the heating line 41 in the heating mode of the vehicle or the coolant of which the temperature is increased while circulating through the heating line 41 to the heater 62 through the operation of the third water pump 42, thereby heating the vehicle interior.

Herein, the third water pump 42 may be electric water pump.

Meanwhile, the heater 62 may be provided inside a heating, ventilation, and air conditioning (HVAC) module 60.

Herein, a second coolant heater 43 to selectively heat the coolant circulating in the heating line 41 may be provided in the heating line 41 between the third water pump 42 and the heater 62.

The second coolant heater 43 is ON-operated when the temperature of the coolant supplied to the heater 62 in the heating mode of the vehicle is lower than a target temperature to heat the coolant circulated in the heating line 41, thereby inflowing the coolant of which the temperature is increased to the heater 62.

The second coolant heater 43 may be an electric heater that operates according to the power supply.

On the other hand, in the present exemplary embodiment, it is described that the second coolant heater 43 is provided in the heating line 41, however it is not limited thereto, and an air heater 45 to increase the temperature of the outside air inflowing to the interior of the vehicle may be applied instead of the second coolant heater 43.

The air heater 45 may be disposed on the rear of the heater 62 toward the interior of the vehicle inside the HVAC module 60 to selectively heat the outside air passing through the heater 62.

That is, any one of the second coolant heater 43 and the air heater 45 may be applied to the heating apparatus 40.

The heating apparatus 40 constructed as described above supplies the high temperature coolant introduced from the cooling apparatus 10 to the heating line 41 in the heating mode of the vehicle or the coolant of which the temperature is increased while circulating through the heating line 41 to the heater 62 through the operation of the third water pump 42, thereby heating the vehicle interior.

In the present exemplary embodiment, the air conditioner 70 may include a cooling line 71 connected to the battery coolant line 21 through a third valve V3, and a fourth water pump 72 and a cooler 64 provided in the cooling line 71 so as to cool an inside of the vehicle by using a coolant of a low temperature.

The air conditioner 70 may supply the coolant hat temperature has decreased while circulating the cooling line 71 to the cooler 62, such that the interior of the vehicle can be cooled in the cooling mode of the vehicle.

Herein, the heater 62 and the cooler 64 may be provided inside the HVAC module 60.

In addition, the first, second, third and fourth water pumps 14, 22, 42, and 72 may be an electric water pump.

The first valve V1 may be a 6-way valve, and the second and third valves V2 and V3 may each be a 4-way valve.

Meanwhile, the HVAC module 60 includes an opening and closing door 66 which is provided between the heater 62 and the cooler 64 and controlled such that an outside air passing through the cooler 64 is selectively flowed into the heater 62 according to the cooling, heating, and dehumidification modes of the vehicle.

That is, the opening and closing door 66 is opened to allow the outside air passing through the cooler 64 to be introduced into the heater 62 in the heating mode of the vehicle. In contrast, in the cooling mode of the vehicle, the opening and closing door 66 closes off the heater 62 such that the outside air that is cooled while passing through the cooler 64 directly flows into the vehicle.

Herein, when the coolant heater 43 is not provided in the heating apparatus 40, the air heater 45 provided in the HVAC module 60 may be provided at an opposite side of the cooler 64 with the heater 62 interposed therebetween.

The air heater 45 may be operated to raise the temperature of the outside air passing through the heater 62 when the temperature of the coolant supplied to the heater 62 is lower than a target temperature for interior heating.

On the other hand, the air heater 45 may be provided inside the HVAC module 60 when the second coolant heater 43 is not provided in the heating line 41.

That is, in the heat pump system according to the present disclosure, only one of the second coolant heater 43 and the air heater 45 may be applied.

In the present exemplary embodiment, the centralized energy (CE) device 50 is connected to the heating and cooling lines 41 and 71 to respectively supply a low-temperature coolant to the air conditioner 70 and a high-temperature coolant to the heating apparatus 40.

The CE device 50 performs selective heat exchange between thermal energy generated from condensation and evaporation of the refrigerant that circulates in the refrigerant line 50 with the coolant that is supplied through the heating and cooling lines 41 and 71, respectively.

Here, the refrigerant may be a high-performing R152-a, R744, or R290 refrigerant.

That is, a high-temperature coolant is supplied to the heater 62 through the heating line 41, and a low-temperature coolant is supplied to the cooler 64 through the cooling line 71.

Herein, the CE device 50 includes a condenser 53, an expansion valve 55, an evaporator 56, and a compressor 59.

First, the refrigerant is circulated inside the condenser 53, and the condenser 53 is provided in the heating line 41 between the second valve V2 and the heater 62.

The condenser 53 may condense the refrigerant through heat-exchange between the refrigerant and the coolant, and increase the temperature of the coolant.

Herein, the coolant circulating the heating apparatus 40 may be supplied to the condenser 53 along the heating line 41 so that the condenser 53 condenses the refrigerant through heat-exchange with the coolant.

Accordingly, the condenser 53 may condense the refrigerant by heat-exchanging from the coolant circulating in the heating line 41 and the high-temperature refrigerant supplied from the compressor 59 in the heating mode of the vehicle, and may supply the high-temperature coolant to the heater 62 through the heating line 41.

The expansion valve 55 may be connected to the condenser 53 through the refrigerant line 51. The expansion valve 55 is expanded by receiving the refrigerant having passed through the condenser 53. The expansion valve 55 may be formed of either a mechanical or electronical type.

The evaporator 56 is connected to the expansion valve 55 through the refrigerant line 51. The evaporator 56 is provided in the cooling line 71 between the third valve V3 and the cooler 64 so as to cool the coolant that circulates along the cooling line 71 in the air conditioner 70.

The evaporator 46 evaporates the refrigerant through heat-exchange with the coolant, and may lower the temperature of the coolant.

Herein, the coolant circulating the air conditioner 70 may be supplied to the evaporator 56 along the cooling line 71 so that the evaporator 56 evaporates the refrigerant through heat-exchange with the coolant.

Accordingly, the evaporator 56 cools the coolant circulating in the cooling mode of the vehicle through the cooling line 71 through heat-exchange with the low-temperature refrigerant evaporated therein, and may supply the low-temperature coolant to the cooler 64 through the cooling line 71.

In addition, the compressor 59 is provided in the refrigerant line 51 between the evaporator 46 and the condenser 53. The compressor 59 compresses the refrigerant of a gas state discharged from the evaporator 56, and may supply the compressed refrigerant to the condenser 53.

The accumulator 57 is provided in the refrigerant line 51 between the evaporator 56 and the compressor 59.

Such the accumulator 57 improves the efficiency and durability of the compressor 59 by supplying only the gaseous refrigerant to the compressor 59.

Herein, the chiller 30 may be provided in the refrigerant line 51 between the evaporator 56 and the accumulator 57.

In the present exemplary embodiment, the chiller 30, the condenser 53, and the evaporator 56 may be a water-cooled heat exchanger into which a coolant flows.

Meanwhile, the chiller 30 may lower the temperature of the coolant passing through the inside of the chiller 30 by using a low-temperature refrigerant supplied from the evaporator 56, when cooling the battery module 24 with the refrigerant.

As a result, the battery module 24 may be cooled more efficiently by inflowing the coolant having the lower temperature while passing through the chiller 30.

On the other hand, an internal heat exchanger 58 may be provided in the refrigerant line 51 between evaporator 56 and the compressor 59.

The refrigerant line 51 that connects the condenser 53 and the expansion valve 55 and the refrigerant line 51 that connects the evaporator 56 and the compressor 59 may be respectively connected to the internal heat exchanger 58.

The internal heat exchanger 58 additionally condenses the refrigerant condensed by the condenser 53 through heat-exchange with a low-temperature refrigerant discharged from the evaporator 56 and then the additionally condensed refrigerant is introduced to the expansion valve 55.

That is, the condensed refrigerant, discharged from the condenser 53, and the low-temperature refrigerant, discharged from the evaporator 56, are respectively introduced into the internal heat exchanger 58. Accordingly, the internal heat exchanger 58 additionally exchanges heat between the low-temperature refrigerant and the condensed refrigerant to further decrease a temperature of the refrigerant and increase the amount of condensation.

As described, since the internal heat exchanger 58 further condenses the refrigerant that has been condensed in the condenser 53, sub-cooling of the refrigerant can be increased, and accordingly, a coefficient of performance, which is a coefficient of cooling performance with respect to power consumption of the compressor, can be improved.

Meanwhile, in the present exemplary embodiment, the evaporated low-temperature refrigerant in the internal heat exchanger 58 and the condensed refrigerant exchange heat with each other, but this is not restrictive. Some of the refrigerant discharged from the internal heat exchanger 58 is bypassed and then cooled, and a remaining refrigerant introduced from the internal heat exchanger 58 may be cooled by simultaneously using the cooled refrigerant and the low-temperature refrigerant discharged from the evaporator 56 to thereby increase sub-cooling of the refrigerant.

Meanwhile, a structure of the first valve V1 will be described in more detail with reference to FIG. 2.

In the present exemplary embodiment, the first valve V1 may include first, second, third, fourth, fifth, and sixth ports P1, P2, P3, P4, P5, and P6.

First, the first port P1 is connected to the coolant line 11 connected to the reservoir tank 16.

The second port P2 is connected to the coolant line 11 connected to the first water pump 14.

Herein, the supply line 17 may be connected to the coolant line 11 connecting the second port P2 and the first water pump 14.

The third port P3 is connected to the chiller connection line 31, and the fourth port P4 is connected to the branch line 18.

The fifth port P5 is connected to the battery coolant line 21 connected to the chiller 30 between the chiller 30 and the first valve V1. The sixth port P6 is connected to the battery coolant line 21 connected to the second water pump 22.

Herein, the first valve V1 may be operated to discharge the coolant through a port adjacent to the port into which the coolant is introduced among the first to sixth ports P1, P2, P3, P4, P5, and P6.

For example, the coolant introduced into the first port P1 may be discharged through the second port P2 or the sixth port P6 disposed adjacent to the first port P1 according to the operation of the first valve V1.

That is, the first valve V1 aims to simplify the structure and, for convenience of valve control, when two ports adjacent to each other are closed, remaining four ports are opened so that two ports adjacent to each other are connected to each other, thereby controlling the flow of the coolant.

Also, the first valve V1 may be operated so that the remaining two ports are connected to each other to control the flow of the coolant, when the four ports adjacent to each other are closed.

Hereinafter, an operation and function of the heat pump system for the vehicle according to an exemplary embodiment of the present disclosure configured as described above will be described in detail with reference to FIG. 3 to FIG. 8.

First, an example operation of cooling the electrical component 15 and the battery module 24 using the radiator 12 in the heat pump system for the vehicle according to the exemplary embodiment of the present disclosure will be described with reference to FIG. 3.

Figure 3:
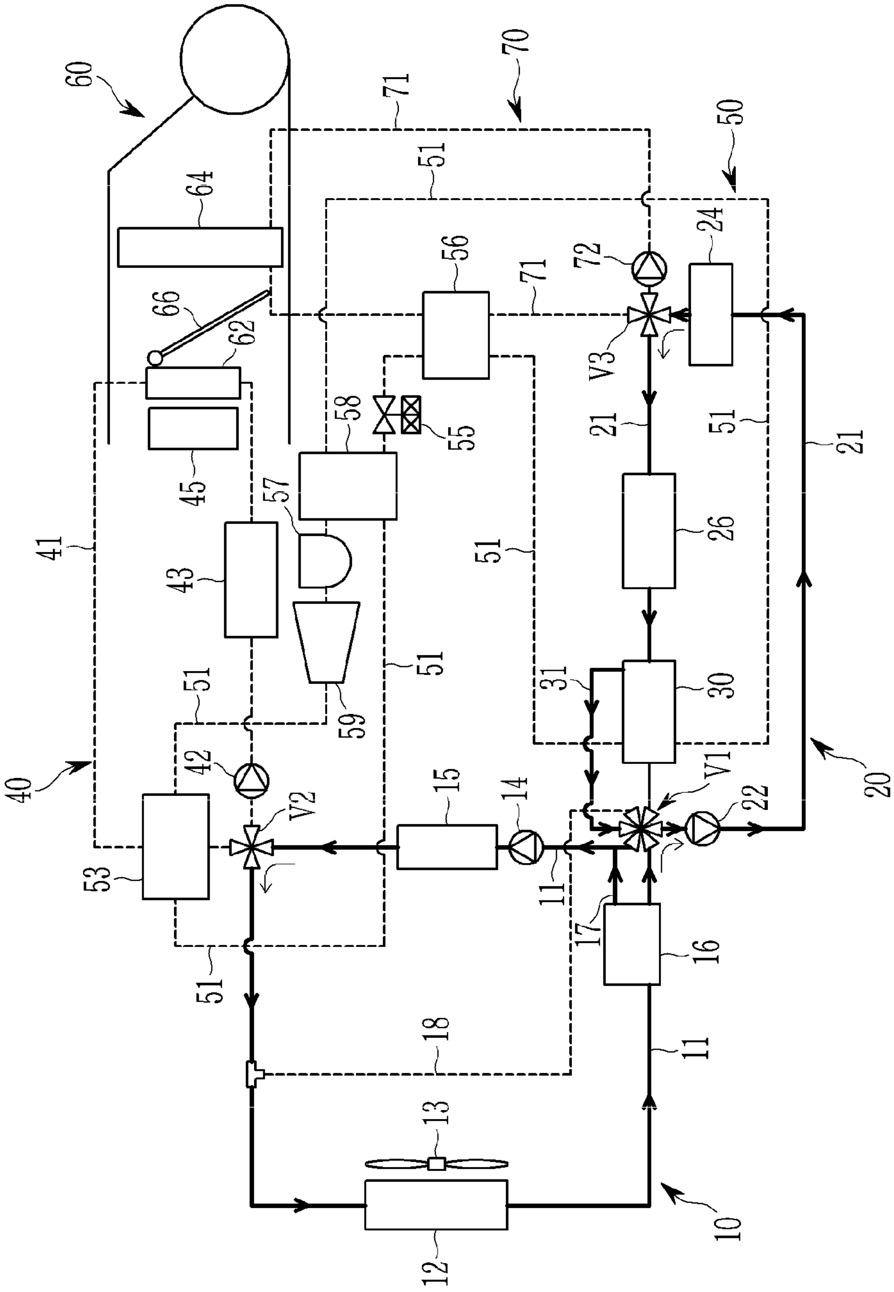
FIG. 3 illustrates an operational state diagram for cooling electrical components and a battery module by using a coolant in the heat pump system for a vehicle according to an exemplary embodiment of the present disclosure.

FIG. 3 illustrates an operational state diagram for cooling electrical components and a battery module by using a radiator in the heat pump system for a vehicle according to an exemplary embodiment of the present disclosure.

Referring to FIG. 3, the branch line 18 is closed through the operation of the first valve V1. The chiller connection line 31 is opened through the operation of the first valve V1.

The supply line 17 is opened. That is, a part of the coolant stored in the reservoir tank 16 may be circulated along the coolant line 11 through the opened supply line 17.

Herein, a portion of the battery coolant line 21 connecting the chiller 30 and the first valve V1 through the operation of the first valve V1 is closed.

In addition, the battery coolant line 21 is connected to the coolant line 11 by the operation of the first valve V1.

The coolant line 11 connecting the reservoir tank 16 and the first valve V1 is connected to the battery coolant line 21 through the operation of the first valve V1.

In this state, in the cooling apparatus 10, the first water pump 14 is operated to cool the electrical component 15.

In the battery cooling apparatus 20, the second water pump 22 is operated to cool the battery module 24.

Then, the coolant that is cooled in the radiator 12 and stored in the reservoir tank 16 is supplied to the battery module 24, while circulating through the battery coolant line 21 by operations of the first valve V1 and the second water pump 22.

That is, the coolant introduced into the first valve V1 from the reservoir tank 16 through the first port P1 is introduced into the battery coolant line 21 through the sixth port P6.

The coolant introduced into the battery coolant line 21 passes through the battery module 24 and is introduced into the chiller 30.

Accordingly, the coolant passing through the battery module 24 is introduced from the chiller 30 to the first valve V1 along the opened chiller connection line 31. Thereafter, the coolant may be supplied to the electrical component 15 while flowing along the coolant line 11 connected to the first water pump 14 by the operation of the first water pump 14.

That is, the coolant discharged from the chiller 30 is introduced into the third port P3 of the first valve V1 along the opened chiller connection line 31, and is discharged to the coolant line 11 connected to the first water pump 14 through the second port P2.

Herein, a part of the coolant stored in the reservoir tank 16 may be circulated along the coolant line 11 through the opened supply line 17.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The CE device 50 and the heating apparatus 40, and the air conditioner 70 are not operated because the cooling mode of the vehicle is not activated.

On the other hand, although it has been described in the present exemplary embodiment that both of the electrical component 15 and the battery module 24 are cooled, the present disclosure is not limited thereto, and when one of the electrical component 15 and the battery module 24 is separately cooled, the first and second water pumps 14 and 22, and the first valve V1 may be selectively operated.

An example operation of cooling the battery module 24 in the cooling mode of the vehicle will be described with respect to FIG. 4.

Figure 4:
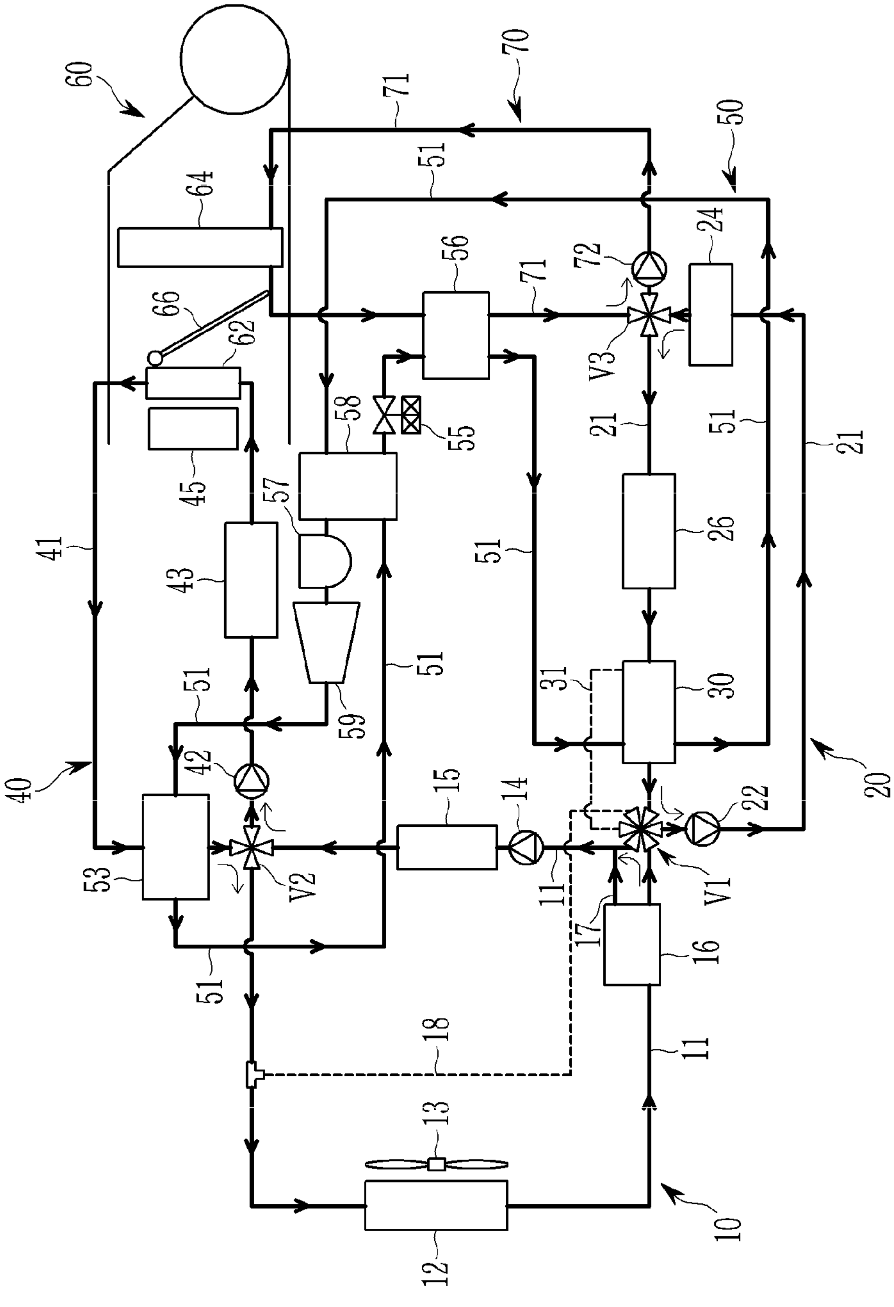
FIG. 4 illustrates an operational state diagram for cooling a battery module by using a refrigerant in a cooling mode of a vehicle in the heat pump system for a vehicle according to an exemplary embodiment of the present disclosure.

FIG. 4 illustrates an operational state diagram for cooling a battery module by using a refrigerant in a cooling mode of a vehicle in the heat pump system for a vehicle according to an exemplary embodiment of the present disclosure.

Referring to FIG. 4, in the cooling apparatus 10, the coolant is circulated in the coolant line 11 by the operation of the first water pump 14. At the same time, the supply line 17 is opened.

That is, a part of the coolant stored in the reservoir tank 16 may be circulated along the coolant line 11 through the opened supply line 17.

Herein, the branch line 18 and the chiller connection line 31 are closed through the operation of the first valve V1.

Accordingly, the coolant introduced into the first valve V1 from the reservoir tank 16 through the first port P1 may be introduced into the coolant line 11 through the second port P2.

In the battery cooling apparatus 20, the second water pump 22 is operated to cool the battery module 24.

Then, in the battery cooling apparatus 20, the coolant may be circulated in the battery coolant line 21 by the operation of the second water pump 22.

Herein, the cooling apparatus 10 and the battery cooling apparatus 20 may form an independent closed circuit through which each coolant is separately circulated by the operation of the first valve V1.

That is, the battery cooling apparatus 20 is not connected to the coolant line 11 by the operation of the first valve V1.

In this state, the battery cooling apparatus 20 may form a closed circuit through which the coolant is independently circulated in the battery coolant line 21 by operation of the second water pump 22.

That is, the coolant line 11 and the battery coolant line 21 form independent closed circuits through the operation of the first valve V1, respectively.

Accordingly, in the battery cooling apparatus 20, the coolant passing through the chiller 30 may be supplied to the battery module 24 along the battery coolant line 21 through the operation of the second water pump 22.

The coolant introduced into the battery coolant line 21 is passed through the battery module 24 and is introduced into the chiller 30.

Accordingly, the coolant passing through the battery module 24 is introduced from the chiller 30 to the first valve V1 along the opened battery coolant line 21. Thereafter, the coolant may be supplied to the battery module 24 while flowing along the battery coolant line 21 by the operation of the second water pump 22.

That is, the coolant discharged from the chiller 30 is introduced into the fifth port P5 of the first valve V1 along the battery coolant line 21, and is discharged to the battery coolant line 21 connected to the second water pump 22 through the sixth port P6.

Meanwhile, in the heating apparatus 40, the heating line 41 is connected to the coolant line 11 through the operation of the second valve V2.

In this state, the coolant supplied from the cooling apparatus 10 is circulated in the heating line 41 through the operation of the third water pump 42.

Accordingly, the coolant cooled in the radiator 12 may be supplied to the condenser 53 through the operation of the first and third water pump 14 and 42, after passing through the electrical component 15.

Meanwhile, in the air conditioner 70, the cooling line 71 may form an independent closed circuit that is independent of the battery coolant line 21 through the operation of the third valve V3, respectively.

Accordingly, in the air conditioner 70, the coolant is circulated along the cooling line 71 by the operation of the fourth water pump 72, and the low-temperature coolant passing through the evaporator 56 may be supplied to the cooler 64.

In the CE device 50, each constituent element operates to cool the interior of the vehicle. Accordingly, the refrigerant is circulated along the refrigerant line 51.

The heating apparatus 40 supplies the coolant, supplied from the cooling apparatus 10 by the operation of the third water pump 42, to the condenser 53.

Accordingly, the condenser 53 condenses the refrigerant supplied from the compressor 59 using the coolant circulating along the heating line 41.

Here, the internal heat exchanger 58 additionally condenses the refrigerant condensed from the condenser 53 by heat-exchanging the refrigerant with a refrigerant of a low temperature exhausted from the evaporation 56 to further increase a condensation amount through increase of subcooling of the refrigerant so that a condensation amount of the refrigerant is increased.

In addition, the evaporator 56 heat-exchanges the coolant circulating along the cooling line 71 with an internally evaporated refrigerant of the low temperature by operations of the fourth water pump 72.

The coolant of a low temperature having passed through the evaporator 56 is supplied to the cooler 64 along the cooling line 71 by the operation of the fourth water pump 72.

That is, the refrigerant circulating along the refrigerant line 51 in the CE device 50 is condensed by heat-exchanging with the coolant passing through the condenser 53.

After that, the condensing amount is further increased while the refrigerant discharged from the condenser 53 is additionally heat-exchanged with the low-temperature refrigerant supplied from the evaporator 56 in the internal heat exchanger 58.

The refrigerant, that the condensing amount is increased, is expanded in the expansion valve 55, and is evaporated in the evaporator 56.

In this case, the refrigerant evaporated from the evaporator 56 cools the coolant introduced through the cooling line 71.

Herein, the coolant having an amount of condensation that is increased while sequentially passing through the condenser 53 and the internal heat exchanger 58 may be expanded and supplied to the evaporator 56, thereby allowing the refrigerant to be evaporated to a lower temperature.

As a result, in the present exemplary embodiment, the internal heat exchanger 58 further condenses the refrigerant, which is advantageous in forming the sub-cooling of the refrigerant.

In addition, since the refrigerant formed with the sub-cooling is evaporated to a further lower temperature at the evaporator 56, the temperature of the coolant heat-exchanging at the evaporator 56 may be further decreased, thereby improving cooling performance and efficiency.

Meanwhile, the refrigerant evaporated from the evaporator 56 cools the coolant introduced through the cooling line 71. Accordingly, the coolant passes through the evaporator 56 to be cooled at a low temperature, and the cooled coolant is supplied to the cooler 64 through the cooling line 71.

The refrigerant that has passed through the evaporator 56 sequentially passes through the chiller 30, the internal heat exchanger 58, the accumulator 57, the compressor 59, and the condenser 53 along the refrigerant line 51.

Herein, an external air introduced into the HVAC module 60 is heat-exchanged with the coolant of a low temperature introduced into the cooler 64 to be cooled.

In this case, a portion of the heater 62 through which the cooled outside air passes is closed by the opening and closing door 66 such that the outside air does not pass through the heater 62. Accordingly, the cooled external air may be directly introduced into an inside of the vehicle to cool the inside of the vehicle.

The coolant passing through the chiller 30 is circulated in the battery coolant line 21 through the operation of the second water pump 22 to cool the battery module 24.

The coolant passing through the chiller 30 is cooled through heat-exchange with the expanded refrigerant that is supplied to the chiller 30. The coolant cooled in the chiller 30 is supplied to the battery module 24. Accordingly, the battery module 24 is cooled by the cooled coolant.

In other words, the coolant with the increased temperature from cooling the battery module 24 is cooled through heat exchange with the low temperature low pressure refrigerant inside the chiller 30. The cooled coolant is again supplied to the battery module 24 through the battery coolant line 21.

Accordingly, the coolant may efficiently cool the battery module 24 while repeating the above-described operation.

In addition, while repeating the above-described process, the coolant may cool the interior of the vehicle in the cooling mode, and the refrigerant may cool the coolant through heat-exchange while passing through the chiller 30.

The low-temperature coolant cooled in the chiller 30 is introduced into the battery module 24. Accordingly, the battery module 24 may be efficiently cooled by the supplied low temperature coolant.

In the present exemplary embodiment, the operation for the case of recovering the waste heat of the electrical component 15 in the heating mode of the vehicle will be described with reference to FIG. 5.

Figure 5:
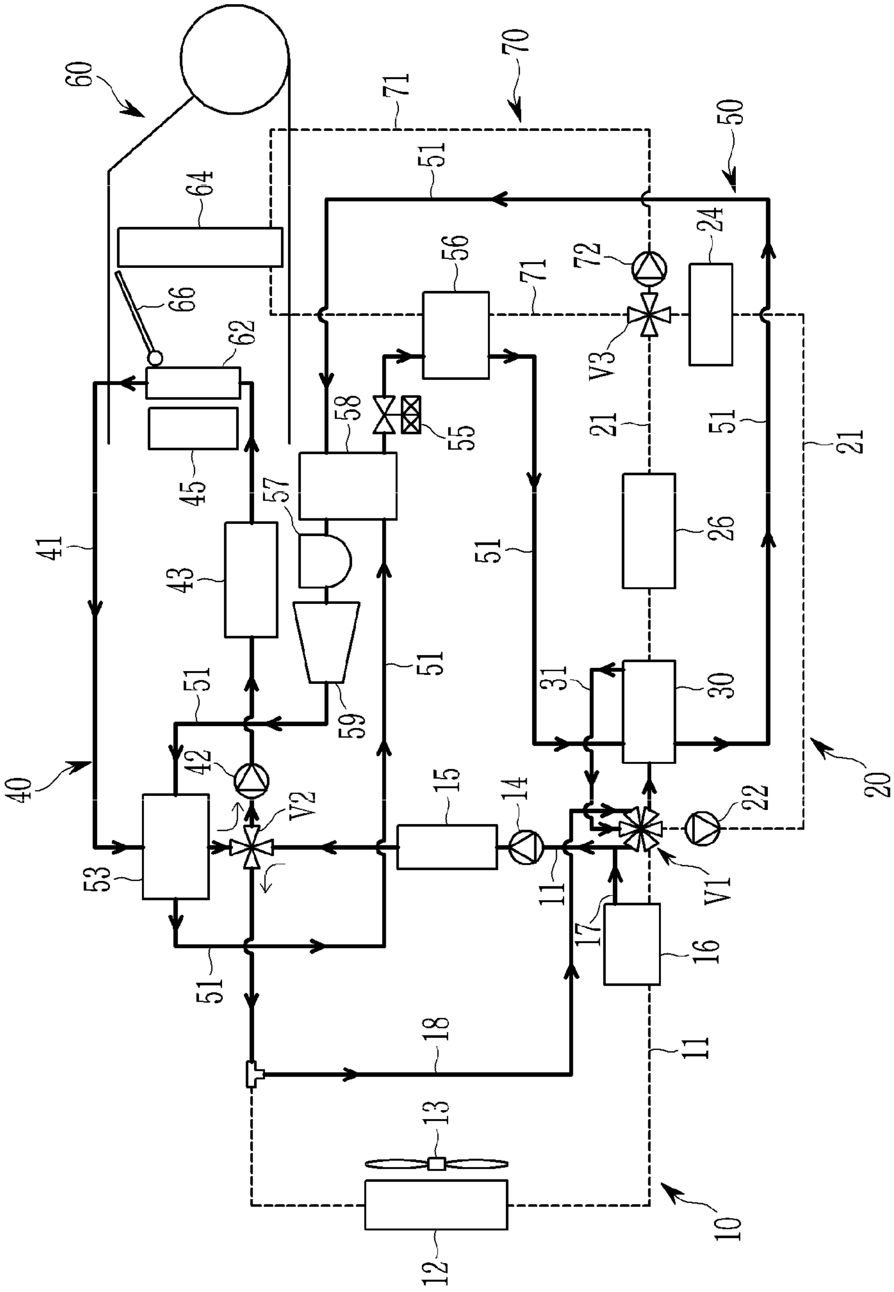
FIG. 5 illustrates an operational state diagram for waste heat recovery of an electrical component depending on a heating mode in a heat pump system for a vehicle according to an exemplary embodiment of the present disclosure.

FIG. 5 illustrates an operational state diagram for waste heat recovery of an electrical component depending on a heating mode in a heat pump system for a vehicle according to an exemplary embodiment of the present disclosure.

Referring to FIG. 5, in the cooling apparatus 10, the first water pump 14 is operated for circulation of the coolant. The supply line 17 is opened.

Thus, a part of the coolant stored in the reservoir tank 16 may be circulated along the coolant line 11 through the opened supply line 17.

Herein, the branch line 18 and the chiller connection line 31 are opened through the operation of the first valve V1.

Accordingly, on the basis of the branch line 18, a portion of the coolant line 11 connected to the radiator 12 and a portion of the coolant line 11 connecting the radiator 12 and the reservoir tank 16 are closed through the operation of the first valve V1.

In this state, the coolant passing through the electrical component 15 may circulate along the opened branch line 18 and an opened portion of the coolant line 11 without passage through the radiator 12 through the operation of the first water pump 14.

Herein, the coolant introduced into the first valve V1 through the branch line 18 may be introduced into the chiller 30 along a portion of the battery coolant line 21 connecting the chiller 30 and the first valve V1.

The coolant passing through the chiller 30 is introduced into the first valve V1 along the opened chiller connection line 31. Thereafter, the coolant is circulated in the coolant line 11 connected to the electrical component 15 through the first valve V1.

Meanwhile, in the battery cooling apparatus 20, the second water pump 22 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

The coolant with the increased temperature may be supplied to the chiller 30 provided at the battery coolant line 21. That is, the waste heat generated by the electrical component 15 raises the temperature of the coolant supplied to the chiller 30.

The coolant introduced from the branch line 18 to the first valve V1 through the fourth port P4 is introduced into the battery coolant line 21 connected to the chiller 30 through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

Meanwhile, in the heating apparatus 40, the coolant circulates along the heating line 41 through the operation of the third water pump 42.

The coolant line 11 and the heating line 41 may form the independent closed circuit through the operation of the second valve V2, respectively.

Thus, the coolant circulating through the heating line 41 may be supplied to the condenser 53 after passing through the heater 62 through the operation of the third water pump 42.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 operates when the temperature of the outside air passing through the heater 62 is lower than the target temperature, and the outside air introduced into the interior of the vehicle may be heated.

In the present exemplary embodiment, in the CE device 50 each constituent element operates to heat the vehicle interior. Thus, the refrigerant circulates along the refrigerant line 51.

The heating apparatus 40 supplies the coolant supplied to the cooling apparatus 10 to the condenser 53 through the operation of the third water pump 42.

Accordingly, the condenser 53 condenses the refrigerant supplied from the compressor 59 by using the coolant circulated along the heating line 41.

That is, in the CE device 50, the refrigerant circulated along the refrigerant line 51 is condensed through heat-exchange with the coolant passing through the condenser 53.

Then, the refrigerant discharged from the condenser 53 is expanded in the expansion valve 55, and evaporated in the evaporator 56.

The refrigerant passing through the evaporator 56 sequentially passes through the chiller 30, the internal heat exchanger 58, the accumulator 57, the compressor 59, and the condenser 53 along the refrigerant line 51.

The coolant, which absorbs the waste heat of the electrical component 15 is increased in temperature, is recovered by increasing the temperature of the refrigerant supplied to the chiller 30 while passing through the chiller 30 through the operation of the first water pump 14.

That is, the chiller 30 evaporates the supplied the refrigerant supplied from the evaporator 56 through heat-exchange with the coolant of which the temperature is increased while passing through the electrical component 15, thereby recovering the waste heat of the electrical component 15.

Thereafter, the refrigerant passing through the chiller 30 is supplied to the accumulator 57 via the internal heat exchanger 58 along the refrigerant line 51.

The refrigerant supplied to the accumulator 57 is separated into gas and liquid. Of the refrigerant separated by gas and liquid, the gaseous refrigerant is supplied to the compressor 59.

The refrigerant compressed with the high temperature high pressure from the compressor 59 inflows to the condenser 53.

Herein, the refrigerant supplied to the condenser 53 may increase the temperature of the coolant by exchanging heat with the coolant circulating through the heating line 41. The coolant with raised temperature is supplied to the heater 62.

Meanwhile, the opening and closing door 66 is opened so that the outside air introduced into the HVAC module 60 and passing through the cooler 64 passes through the heater 62.

As a result, the outside air inflow from the outside flows into the interior in an uncooled temperature state when passing through the cooler 64, which is not supplied with the refrigerant. The introduced outside air is converted to a high temperature state while passing through the heater 62 to be introduced into the interior of the vehicle, thereby realizing the heating of the interior of the vehicle.

That is, the heat pump system according to the present exemplary embodiment is used to increase the temperature of the refrigerant by using the waste heat of the electrical component 15, when the heating of the vehicle is required, thereby reducing the power consumption of the compressor 59 and improving the heating efficiency.

The present exemplary embodiment in which the waste heat of the electrical component 15 is recovered in the heating mode of the vehicle is exemplarily described, but the present disclosure is not limited thereto, and only waste heat from the battery module 24 may be recovered or the waste heat from the electrical component 15 and the battery module 24 may be recovered together.

In the heating mode of the vehicle, the operation for using the waste heat of the electrical component 15 without the operation of the CE device 50 will be described with reference to FIG. 6.

Figure 6:
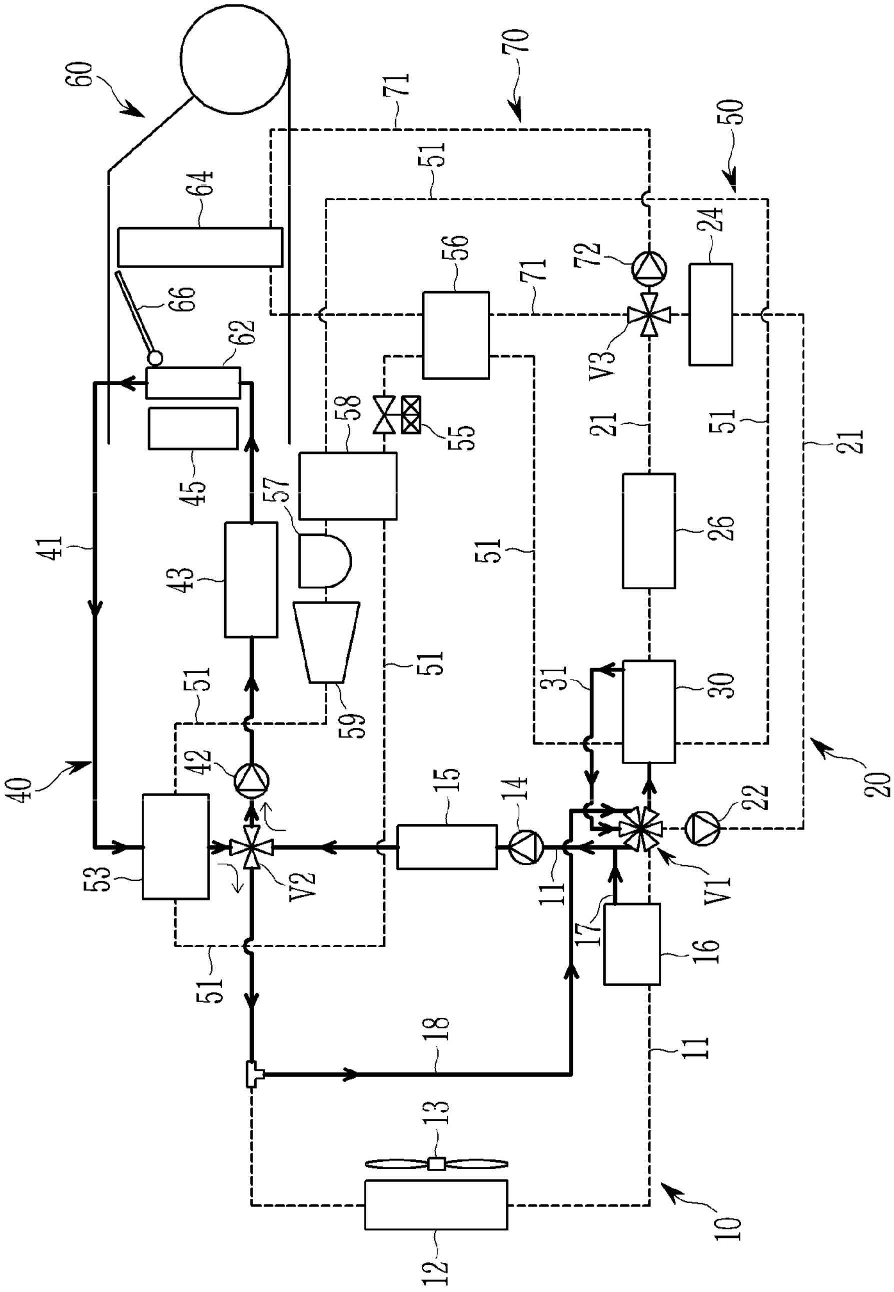
FIG. 6 illustrates an operational state diagram for performing the heating mode using waste heat of an electrical component in a heat pump system for a vehicle according to an exemplary embodiment of the present disclosure.

FIG. 6 illustrates an operational state diagram for performing the heating mode using waste heat of electrical component in a heat pump system for a vehicle according to an exemplary embodiment of the present disclosure.

Referring to FIG. 6, the heat pump system may heat the interior of the vehicle by using the waste heat from the electrical component 15 without an operation of the CE device 50.

First, in the cooling apparatus 10, the first water pump 14 is operated for circulation of the coolant. At this time, the CE device 50 is stopped.

Herein, the branch line 18 and the chiller connection line 31 are opened through the operation of the first valve V1. In addition, the supply line 17 is opened.

Thus, a part of the coolant stored in the reservoir tank 16 may be circulated along the coolant line 11 through the opened supply line 17.

Accordingly, on the basis of the branch line 18, a portion of the coolant line 11 connected to the radiator 12 and a portion of the coolant line 11 connecting the radiator 12 and the reservoir tank 16 are closed through the operation of the first valve V1.

That is, on the basis of the branch line 18, the portion of the coolant line 11 connected to the radiator 12, the reservoir tank 16, and the first valve V1 may be closed.

In addition, the battery coolant line 21 except for the battery coolant line 21 connected to the chiller 30 is closed through the operation of the first valve V1.

In this state, the coolant passing through the electrical component 15 may circulate along the opened branch line 18 and an opened portion of the coolant line 11 without passage through the radiator 12 through the operation of the first water pump 14.

Herein, the coolant introduced into the first valve V1 through the branch line 18 may be introduced into the chiller 30 along a portion of the battery coolant line 21 connecting the chiller 30 and the first valve V1.

The coolant passing through the chiller 30 is introduced into the first valve V1 along the opened chiller connection line 31. Thereafter, the coolant is circulated in the coolant line 11 connected to the electrical component 15 through the first valve V1.

Meanwhile, in the battery cooling apparatus 20, the second water pump 22 is deactivated.

That is, the battery coolant line 21 connecting the second water pump 22 and the battery module 24 is closed, and the operation of the battery cooling apparatus 20 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

That is, the coolant introduced from the branch line 18 to the first valve V1 through the fourth port P4 is introduced into the battery coolant line 21 connected to the chiller through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

In the heating apparatus 40, the heating line 41 is connected to the coolant line 11 through the operation of the second valve V2.

In this state, the coolant having the temperature that has risen while passing through the electrical component 15 by the operation of the first water pump 14 is supplied to the heating line 41 connected to the opened coolant line 11 without passing through the radiator 12.

The coolant introduced into the heating line 41 may be supplied to the heater 62 through the operation of the third water pump 42.

The coolant discharged from the heater 62 passes through the second valve V2 and is introduced into the first valve V1 along the opened portion of the coolant line 11 and the opened branch line 18.

The coolant introduced into the first valve V1 is again introduced into the first valve V1 along the opened chiller connection line 31 after passing through the chiller 30 along the opened portion of the battery coolant line 21.

The coolant again introduced into the first valve V1 is supplied to the electrical component 15 along the opened the coolant line 11.

That is, the coolant that has passed through the electrical component 15 continues to circulate along the opened coolant line 11, the branch line 18, the opened portion of the battery coolant line 21, and the chiller connection lines 31 without passing through the radiator 12, and absorbs the waste heat from the electric component 15, such that the temperature thereof increases.

The coolant having the temperature that has been raised is introduced into the heating line 41 connected to the coolant line 11 without passing through the radiator 12.

The coolant introduced into the heating line 41 may pass through the heater 62 through the operation of the third water pump 42.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 may be selectively operated depending on the temperature of the outside air passing through the heater 62.

That is, the air heater 45 may be operated when the temperature of the outside air passing through the heater 62 is lower than a target temperature, thereby heating the outside air flowing into the interior of the vehicle.

The air heater 45 is operated when the temperature of the outside air that has completed heat exchange with the high-temperature coolant while passing through the heater 62 is lower than a set temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 62 performs heat exchange with the outside air, and then is introduced into a part of the coolant line 11 connected to the heating line 41 through the second valve V2.

Thereafter, the coolant is introduced into the first valve V1 along the opened branch line 18 without passing through the radiator 12.

The coolant introduced into the first valve V1 sequentially passes the opened battery coolant line 21, the chiller 30, and the chiller connection line 31, and is again introduced into the coolant line 11 connected to the electrical component 15.

Meanwhile, the opening and closing door 66 is opened such that the outside air flowing into the HVAC module 60 passes through the heater 62.

As a result, the outside air inflow from the outside flows into the interior in an uncooled temperature state when passing through the cooler 64, which is not supplied with the refrigerant. The introduced outside air is converted to a high temperature state while passing through the heater 62 to be introduced into the interior of the vehicle, thereby realizing the heating of the interior of the vehicle.

In other words, according to the present disclosure, it is possible to recover the waste heat generated in the electrical component 15 while repeating the above-described process, and use the waste heat for interior heating, thereby reducing power consumption and improving overall heating efficiency.

The operation according to a low temperature dehumidification mode of the vehicle in the present exemplary embodiment will be described with reference to FIG. 7.

Figure 7:
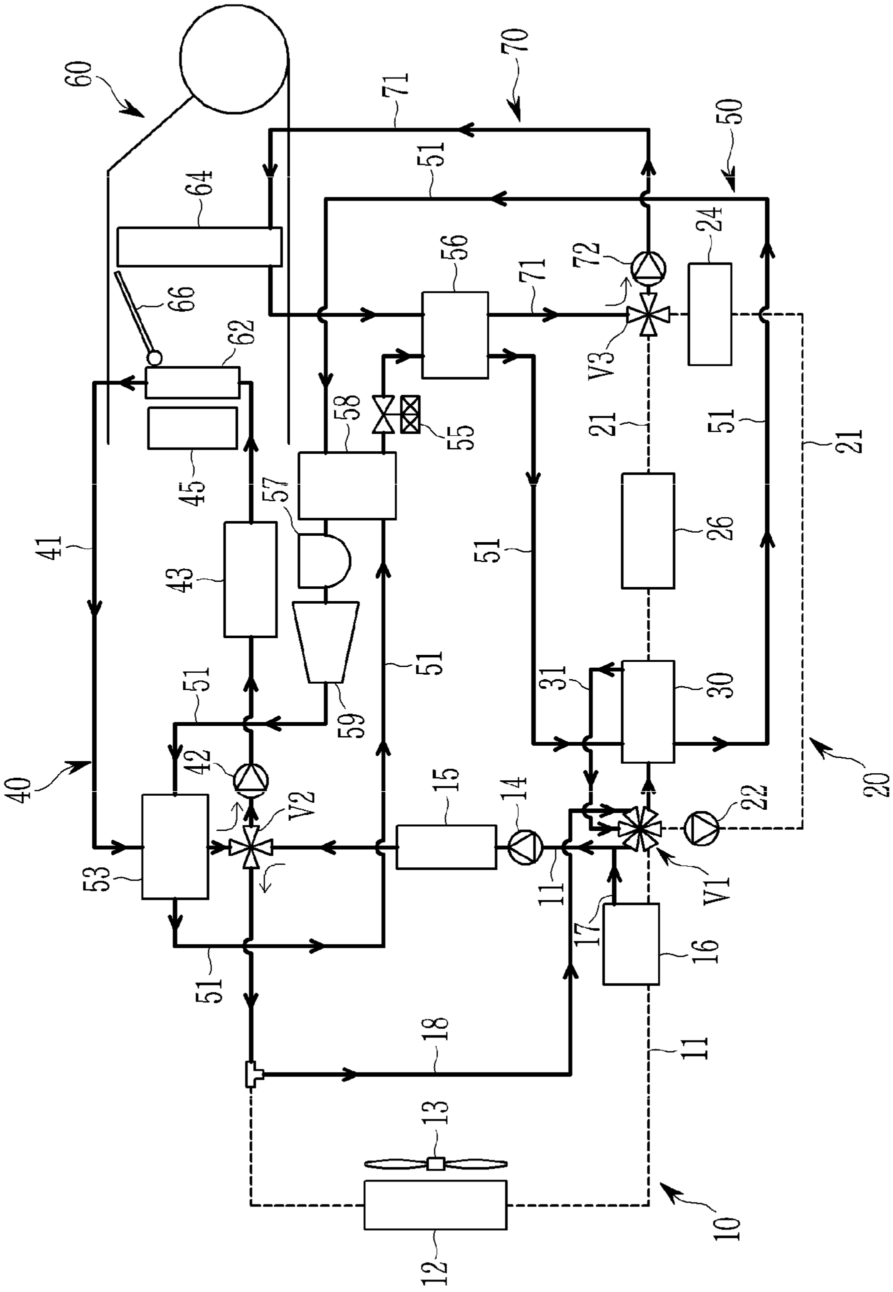
FIG. 7 illustrates an operational state diagram according to a low temperature dehumidification mode in a heat pump system for a vehicle according to another exemplary embodiment of the present disclosure.

FIG. 7 illustrates an operational state diagram according to a low temperature dehumidification mode in a heat pump system for a vehicle according to another exemplary embodiment of the present disclosure.

Herein, the low temperature dehumidification mode is a mode that operates when dehumidification is required in the vehicle interior in the heating mode of the vehicle.

Referring to FIG. 7, when the waste heat of the electrical component 15 is sufficient, the heat pump system may recover the waste heat of the electrical component 15 and use it for the interior heating of the vehicle.

First, in the cooling apparatus 10, the first water pump 14 is operated for circulation of the coolant. At the same time, the supply line 17 is opened.

Thus, a part of the coolant stored in the reservoir tank 16 may be circulated along the coolant line 11 through the opened supply line 17.

Herein, the branch line 18 and the chiller connection line 31 are opened through the operation of the first valve V1.

Accordingly, on the basis of the branch line 18, a portion of the coolant line 11 connected to the radiator 12 and a portion of the coolant line 11 connecting the radiator 12 and the reservoir tank 16 are closed through the operation of the first valve V1.

In this state, the coolant passing through the electrical component 15 may circulate along the opened branch line 18 and an opened portion of the coolant line 11 without passage through the radiator 12 through the operation of the first water pump 14.

Herein, the coolant introduced into the first valve V1 through the branch line 18 may be introduced into the chiller 30 along a portion of the battery coolant line 21 connecting the chiller 30 and the first valve V1.

The coolant passing through the chiller 30 is introduced into the first valve V1 along the opened chiller connection line 31. Thereafter, the coolant is circulated in the coolant line 11 connected to the electrical component 15 through the first valve V1.

Meanwhile, in the battery cooling apparatus 20, the second water pump 22 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

The coolant with the increased temperature may be supplied to the chiller 30 provided at the battery coolant line 21. That is, the waste heat generated by the electrical component 15 raises the temperature of the coolant supplied to the chiller 30.

The coolant introduced from the branch line 18 to the first valve V1 through the fourth port P4 is introduced into the battery coolant line 21 connected to the chiller 30 through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

Meanwhile, in the heating apparatus 40, the coolant circulates along the heating line 41 through the operation of the third water pump 42.

The coolant line 11 and the heating line 41 may form the independent closed circuit through the operation of the second valve V2.

Thus, the coolant circulating through the heating line 41 may be supplied to the condenser 53 after passing through the heater 62 through the operation of the third water pump 42.

As a result, the condenser 53 condenses the refrigerant supplied from the compressor 59 using the coolant circulating along the heating line 41.

At this time, the temperature of the coolant circulating in the heating line 41 is increased by heat exchange with the refrigerant while passing through the condenser 53. The coolant with the increased temperature may be supplied to the heater **52*a* along the heating line 41**.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 operates when the temperature of the outside air passing through the heater 62 is lower than the target temperature, and the outside air introduced into the interior of the vehicle may be heated.

The air heater 45 is operated when the temperature of the outside air that has completed heat exchange with the high-temperature coolant while passing through the heater 62 is lower than a set temperature or a target heating temperature.

When the air heater 45 is operated, the outside air may be heated while passing through the air heater 45, to be introduced into the vehicle interior in a state where the temperature is raised.

In the present exemplary embodiment, in the CE device 50 each constituent element operates to heat the vehicle interior. Thus, the refrigerant circulates along the refrigerant line 51.

The heating apparatus 40 supplies the coolant circulating the heating line 41 to the condenser 53 through the operation of the third water pump 42.

Accordingly, the condenser 53 condenses the refrigerant supplied from the compressor 59 by using the coolant circulated along the heating line 41.

The internal heat exchanger 58 additionally condenses the refrigerant condensed from the condenser 53 by heat-exchanging the refrigerant with a refrigerant of a low temperature exhausted from the evaporation 56 to further increase a condensation amount through increase of sub-cooling of the refrigerant so that a condensation amount of the refrigerant is increased.

Meanwhile, in the air conditioner 70, the coolant is circulated along the second connection line 71 through the operation of the fourth water pump 72.

Thus, the evaporator 56 heat-exchanges the coolant circulating along the cooling line 71 with an internally evaporated refrigerant of the low temperature by operations of the fourth water pump 72.

The coolant of a low temperature having passed through the evaporator 56 is supplied to the cooler 64 along the cooling line 71 by the operation of the fourth water pump 72.

Accordingly, in the air conditioner 70, the coolant is circulated along the cooling line 71 by the operation of the fourth water pump 72, and the low-temperature coolant passing through the evaporator 56 may be supplied to the cooler 64.

That is, the refrigerant circulating along the refrigerant line 51 in the CE device 50 is condensed by heat-exchanging with the coolant passing through the condenser 53.

Herein, the internal heat exchanger 58 additionally condenses a medium-temperature refrigerant discharged from the condenser 53 by heat-exchanging the refrigerant with a refrigerant of a low temperature exhausted from the evaporation 56 to further increase a condensation amount through increase of sub-cooling of the refrigerant so that a condensation amount of the refrigerant is increased.

The refrigerant, that the condensing amount is increased, is expanded in the expansion valve 55, and is evaporated in the evaporator 56.

In this case, the refrigerant evaporated from the evaporator 56 cools the coolant introduced through the cooling line 71. Accordingly, the coolant passes through the evaporator 56 to be cooled at a low temperature, and the cooled coolant is supplied to the cooler 64 through the cooling line 71.

Meanwhile, the refrigerant that has passed through the evaporator 56 sequentially passes through the chiller 30, the internal heat exchanger 58, the accumulator 57, the compressor 59, and the condenser 53 along the refrigerant line 51.

The coolant, which absorbs the waste heat of the electrical component 15 is increased in temperature, is recovered by increasing the temperature of the refrigerant supplied to the chiller 30 while passing through the chiller 30 through the operation of the first water pump 14.

That is, the chiller 30 evaporates the supplied the refrigerant supplied from the evaporator 56 through heat-exchange with the coolant of which the temperature is increased while passing through the electrical component 15, thereby recovering the waste heat of the electrical component 15.

Thereafter, the refrigerant passing through the chiller 30 is supplied to the accumulator 57 via the internal heat exchanger 58 along the refrigerant line 51.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Herein, the refrigerant supplied to the condenser 53 may increase the temperature of the coolant by exchanging heat with the coolant circulating through the heating line 41. The coolant with raised temperature is supplied to the heater 62.

Meanwhile, the opening and closing door 66 is opened so that the outside air introduced into the HVAC module 60 and passing through the cooler 64 passes through the heater 62.

That is, the outside air introduced into the HVAC module 60 is dehumidified while passing through the cooler 64 to which the low-temperature coolant is supplied.

The outdoor air dehumidified while passing through the cooler 64 is converted to a high temperature state while passing through the heater 62 and introduced into the vehicle interior, thereby heating and dehumidifying the interior of the vehicle.

That is, in the low temperature dehumidification mode, the heat pump system according to the exemplary embodiment absorbs the waste heat of the electrical component 15 and uses the absorbed waste heat for raising the temperature of the refrigerant to reduce the power consumption of the compressor 59 and enhance the heating efficiency.

In addition, the heat pump system may perform the interior dehumidification together by operating the air conditioner 70 to selectively supply the low-temperature coolant to the cooler 64.

In the present exemplary embodiment, the operation according to a high temperature dehumidification mode of the vehicle will be described with reference to FIG. 8.

Figure 8:
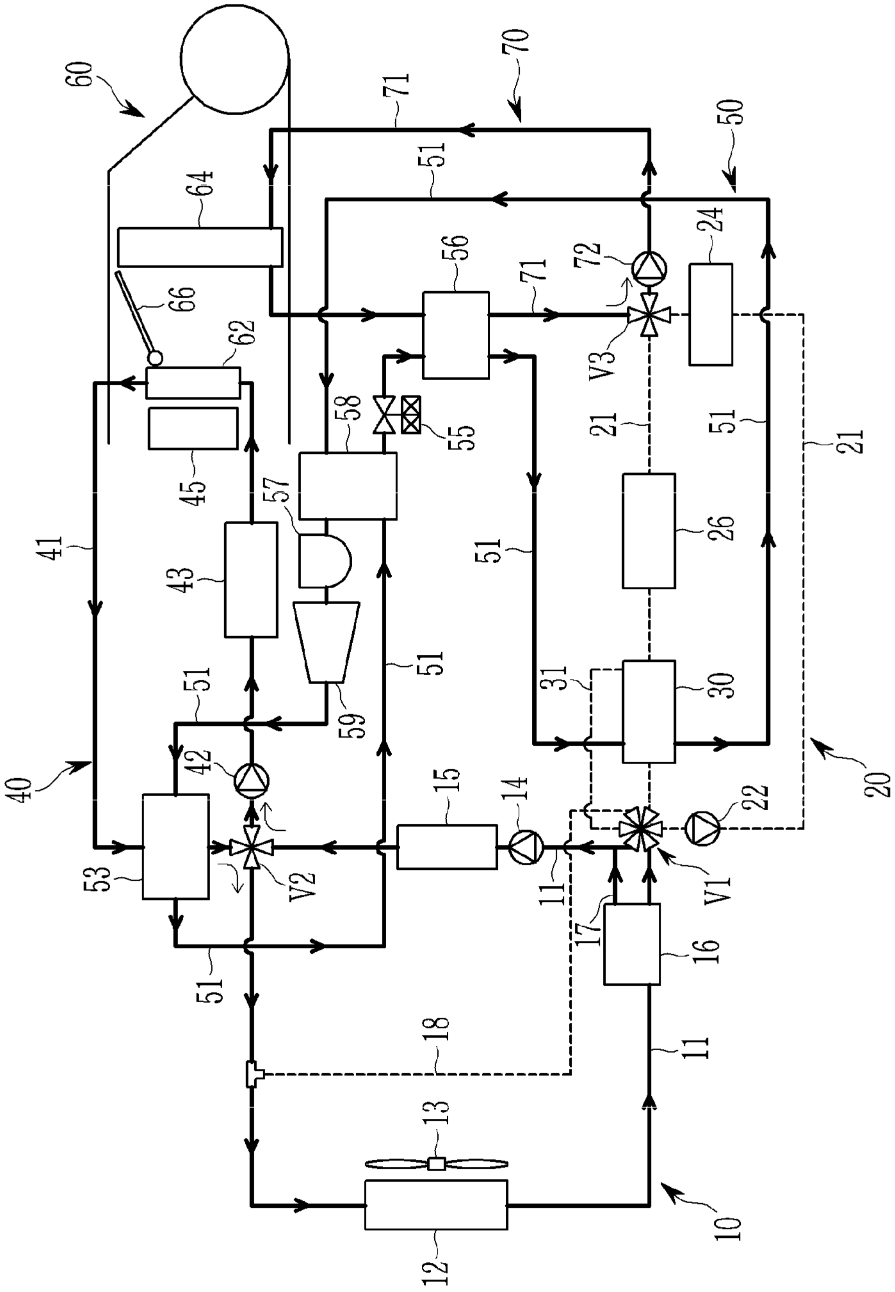
FIG. 8 illustrates an operational state diagram according to a high temperature dehumidification mode in a heat pump system for a vehicle according to another exemplary embodiment of the present disclosure.

FIG. 8 illustrates an operational state diagram according to a high temperature dehumidification mode in a heat pump system for a vehicle according to another exemplary embodiment of the present disclosure.

Here, the high temperature dehumidification mode is a mode in which the dehumidification is performed in the vehicle interior in the cooling mode of the vehicle.

Referring to FIG. 8, in the cooling apparatus 10, the coolant is circulated in the coolant line 11 by the operation of the first water pump 14. At the same time, the supply line 17 is opened.

That is, a part of the coolant stored in the reservoir tank 16 may be circulated along the coolant line 11 through the opened supply line 17.

Herein, the branch line 18 and the chiller connection line 31 are closed through the operation of the first valve V1.

Accordingly, the coolant introduced into the first valve V1 from the reservoir tank 16 through the first port P1 may be introduced into the coolant line 11 through the second port P2.

Thus, the coolant cooled by the radiator 12 is circulated to the electrical component 15.

Meanwhile, in the battery cooling apparatus 20, the second water pump 22 is deactivated.

In the heating apparatus 40, the heating line 41 is connected to the coolant line 11 through the operation of the second valve V2.

In this state, the coolant supplied from the cooling apparatus 10 is circulated in the heating line 41 through the operation of the third water pump 42.

Accordingly, the coolant cooled in the radiator 12 may be supplied to the condenser 53 through the operation of the first and third water pump 14 and 42, after passing through the electrical component 15.

Meanwhile, in the air conditioner 70, the cooling line 71 may form an independent closed circuit that is independent of the battery coolant line 21 through the operation of the third valve V3, respectively.

Accordingly, in the air conditioner 70, the coolant is circulated along the cooling line 71 by the operation of the fourth water pump 72, and the low-temperature coolant passing through the evaporator 56 may be supplied to the cooler 64.

In the CE device 50, each constituent element operates to cool the interior of the vehicle. Accordingly, the refrigerant is circulated along the refrigerant line 51.

The heating apparatus 40 supplies the coolant, supplied from the cooling apparatus 10 by the operation of the third water pump 42, to the condenser 53.

Accordingly, the condenser 53 condenses the refrigerant supplied from the compressor 59 using the coolant circulating along the heating line 41.

Here, the internal heat exchanger 58 additionally condenses the refrigerant condensed from the condenser 53 by heat-exchanging the refrigerant with a refrigerant of a low temperature exhausted from the evaporation 56 to further increase a condensation amount through increase of sub-cooling of the refrigerant so that a condensation amount of the refrigerant is increased.

In addition, the evaporator 56 heat-exchanges the coolant circulating along the cooling line 71 with an internally evaporated refrigerant of the low temperature by operations of the fourth water pump 72.

The coolant of a low temperature having passed through the evaporator 56 is supplied to the cooler 64 along the cooling line 71 by the operation of the fourth water pump 72.

That is, the refrigerant circulating along the refrigerant line 51 in the CE device 50 is condensed by heat-exchanging with the coolant passing through the condenser 53.

After that, the condensing amount is further increased while the refrigerant discharged from the condenser 53 is additionally heat-exchanged with the low-temperature refrigerant supplied from the evaporator 56 in the internal heat exchanger 58.

The refrigerant, that the condensing amount is increased, is expanded in the expansion valve 55, and is evaporated in the evaporator 56.

In this case, the refrigerant evaporated from the evaporator 56 cools the coolant introduced through the cooling line 71.

Herein, the coolant having an amount of condensation that is increased while sequentially passing through the condenser 53 and the internal heat exchanger 58 may be expanded and supplied to the evaporator 56, thereby allowing the refrigerant to be evaporated to a lower temperature.

As a result, in the present exemplary embodiment, the internal heat exchanger 58 further condenses the refrigerant, which is advantageous in forming the sub-cooling of the refrigerant.

In addition, since the refrigerant formed with the sub-cooling is evaporated to a further lower temperature at the evaporator 56, the temperature of the coolant heat-exchanging at the evaporator 56 may be further decreased, thereby improving cooling performance and efficiency.

Meanwhile, the refrigerant evaporated from the evaporator 56 cools the coolant introduced through the cooling line 71. Accordingly, the coolant passes through the evaporator 56 to be cooled at a low temperature, and the cooled coolant is supplied to the cooler 64 through the cooling line 71.

The refrigerant that has passed through the evaporator 56 sequentially passes through the chiller 30, the internal heat exchanger 58, the accumulator 57, the compressor 59, and the condenser 53 along the refrigerant line 51.

Herein, an external air introduced into the HVAC module 60 is heat-exchanged with the coolant of a low temperature introduced into the cooler 64 to be cooled.

At this time, the opening and losing door 66 opens a portion passing through the heater 62 so that cooled outside air passes through the heater 62. Accordingly, the cooled outside air may be dehumidify while passing through the heater 62 and then flow into the interior of the vehicle.

That is, the high temperature dehumidification mode of the vehicle cools the interior of the vehicle by using the coolant while repeatedly performing the above-described processes, and simultaneously supplies the coolant having the increased temperature through heat-exchange with the refrigerant in the condenser 53 to the heater 62, thereby performing the interior dehumidification together therewith.

As described above, the heat pump system for the vehicle according to an exemplary embodiment of the present disclosure is applied, a system may be simplified and a layout of connection pipes in which a coolant circulates may be simplified by selectively heat-exchanging heat energy generated from a refrigerant with a coolant upon condensation and evaporation of the refrigerant to control an internal temperature of the vehicle using the heat-exchanged coolant of a low temperature or a high temperature.

According to the present disclosure, the temperature of the battery module 24 may be adjusted depending on the mode of the vehicle by using one chiller 30 for performing heat exchange between the coolant and the refrigerant, and the interior of the vehicle may be cooled and heated by using the coolant, thereby simplifying the entire system.

Further, the present disclosure may improve heating efficiency of the vehicle using waste heat of electrical component 15 and a battery module 24, and may increase the whole travel distance of the vehicle through efficient temperature control of a battery module 24 in order to obtain optimal performance of the battery module.

Moreover, the present disclosure may reduce a size and a weight by packaging a centralized energy device 50 for generating heat energy through condensation and evaporation of a refrigerant, and may prevent generation of noise, vibration, and operational instability as compared with an air conditioner in the related art by using a high performance refrigerant.

In addition, the present disclosure can use one of the second coolant heater 43, or the air heater 45 applied to the heating apparatus 40 can be used to assist in an interior heating of the vehicle, thereby reducing cost and weight.

Further, the entire system may be simplified to reduce manufacturing cost and weight, and to improve space utilization.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A heat pump system for a vehicle comprising:

a cooling apparatus configured to include a radiator, a first water pump, a first valve, a second valve, and a reservoir tank which are connected through a coolant line, and to circulate a coolant in the coolant line to cool at least one electrical component provided in the coolant line;

a battery cooling apparatus configured to include a battery coolant line connected to the coolant line through the first valve, and a second water pump and a battery module which are connected through the battery coolant line to circulate the coolant in the battery module;

a chiller provided in the battery coolant line between the first valve and the battery module, through which a refrigerant passes, to adjust a temperature of the coolant by performing heat exchange between the coolant that is selectively introduced into the battery coolant line and a refrigerant;

a heating apparatus including a heating line selectively connected to the coolant line through the second valve to heat a vehicle interior by using a coolant, and a third water pump and a heater provided on the heating line;

an air conditioner including a cooling line selectively connected to the battery coolant line through a third valve to cool the interior of the vehicle by using a coolant, and a fourth water pump and a cooler provided in the cooling line;

a centralized energy device connected to the heating and cooling lines in order to supply a coolant of a high temperature to the heating apparatus, and to supply a coolant of a low temperature to the an air conditioner, and selectively heat-exchanging heat energy generated upon condensing and evaporation of a refrigerant circulating an inside with each coolant supplied through the heating and cooling lines, and suppling a refrigerant to chiller;

a branch line having a first end connected to the coolant line between the radiator and the second valve, and a second end connected to the first valve; and a chiller connection line connecting the chiller and the first valve separately from the battery coolant line.

2. The heat pump system of claim 1, wherein:

the first valve includes:

a first port connected to the coolant line connected to the reservoir tank;

a second port connected to the coolant line connected the first water pump;

a third port connected to the chiller connection line;

a fourth port connected to the branch line;

a fifth port connected to the battery coolant line connected to the chiller; and a sixth port connected to the battery coolant line connected to the second water pump.

3. The heat pump system of claim 2, wherein:

the first valve is operated to discharge the coolant through a port adjacent to a port into which coolant is introduced among the first to sixth ports.

4. The heat pump system of claim 1, wherein:

the reservoir tank is provided in the coolant line between the radiator and the first valve, and is connected to the coolant line connecting the first valve and the first water pump through the supply line.

5. The heat pump system of claim 1, wherein:

the heater and the cooler are provided inside an HVAC module, and the HVAC module includes an opening and closing door provided between the heater and the cooler and configured to control outside air passing through the cooler to be selectively introduced into the heater depending on cooling, heating, and dehumidifying modes of the vehicle therein.

6. The heat pump system of claim 5, wherein:

the HVAC module further includes an air heater provided at an opposite side of the cooler, with the heater interposed therebetween to selectively heat outside air passing through the heater, and the air heater is operated to raise a temperature of the outside air passing through the heater when a temperature of a coolant supplied to the heater is lower than a target temperature for interior heating.

7. The heat pump system of claim 1, wherein:

the centralized energy device includes:

a condenser that circulates a refrigerant therein, is provided in the heating line between the second valve and the heater, condenses the refrigerant through heat-exchange between the refrigerant and the coolant, and increases a temperature of the coolant;

an expansion valve connected to the condenser through the refrigerant line;

an evaporator that is connected to the expansion valve through the refrigerant line, is provided on the cooling line between the third valve and the cooler, evaporates the refrigerant through heat-exchange between the refrigerant and the coolant, and lowers a temperature of the coolant;

a compressor that is provided on the refrigerant line between the evaporator and the condenser; and an accumulator that is provided on the refrigerant line between the evaporator and the compressor;

wherein the chiller may be provided on the refrigerant line between the evaporator and the accumulator.

8. The heat pump system of claim 7, wherein:

in the heating mode of the vehicle, the condenser condenses the refrigerant by heat-exchanging between the coolant circulating the heating line and the high-temperature refrigerant supplied from the compressor, and supplies a high-temperature coolant to heater through the heating line.

9. The heat pump system of claim 7, wherein:

in the cooling mode of the vehicle, the evaporator heat-exchanges a coolant circulating the cooling line with an internally evaporated refrigerant of a low temperature to cool the coolant, and supplies a low-temperature coolant to cooler through the cooling line.

10. The heat pump system of claim 7, wherein:

an internal heat exchanger is provided in the refrigerant line between the evaporator and the compressor.

11. The heat pump system of claim 10, wherein:

the refrigerant line that connects the condenser and the expansion valve and the refrigerant line that connects the evaporator and the compressor are respectively connected to the internal heat exchanger, and the internal heat exchanger additionally condenses the refrigerant condensed by the condenser through heat-exchange with a low-temperature refrigerant discharged from the evaporator, and the additionally condensed refrigerant is introduced into the expansion valve.

12. The heat pump system of claim 7, wherein:

when the battery module is cooled in the cooling mode of the vehiclein the cooling apparatus, the coolant is circulated in the coolant line by the operation of the first water pump;

the branch line and the chiller connection line are closed through the operation of the first valve;

the coolant line and the battery coolant line form an independent closed circuits through the operation of the first valve;

in the battery cooling apparatus, the coolant passing through the chiller is supplied to the battery module along the battery coolant line through the operation of the second water pump;

in the heating apparatus, the coolant line and the heating line are connected through the operation of the second valve so that the coolant is supplied from the cooling apparatus;

the coolant is circulated along the heating line through an operation of the third water pump;

in the air conditioner, the cooling line forms an independent closed circuit that is independent of the battery coolant line through an operation of the third valve, respectively;

the coolant is circulated along the cooling line through an operation of the fourth water pump, and a coolant passing through the evaporator is supplied to the cooler; and in the centralized energy device, each constituent element operates such that the refrigerant is circulated along the refrigerant line.

13. The heat pump system of claim 12, wherein:

the coolant circulating the heating apparatus is supplied to the condenser along the heating line so that the condenser condenses the refrigerant through heat-exchange with the coolant, and the coolant circulating the air conditioner is supplied to the evaporator along the second connection line so that the evaporator evaporates the refrigerant through heat-exchange with the coolant.

14. The heat pump system of claim 7, wherein:

when recovering the waste heat of the electrical component in a heating mode of the vehicle:

the branch line and the chiller connection line are opened through the operation of the first valve;

in the cooling apparatus, on the basis of the branch line, a portion of the coolant lines respectively connected to the radiator and the reservoir tank are closed, and the coolant passing through the electrical component circulates along the opened branch line and an opened portion of the coolant line without passage through the radiator through the operation of the first water pump;

the coolant introduced into the first valve through the branch line is introduced into the chiller along a portion of the battery coolant line connecting the chiller and the first valve;

the coolant passing through the chiller is introduced into the first valve along the opened chiller connection line, and then is circulated in the coolant line connected to the electrical component through the first valve;

the coolant line and the heating line form an independent closed circuits through the operation of the second valve, respectively;

in the heating apparatus, the coolant circulates along the heating line through the operation of the third water pump;

the battery cooling apparatus and the air conditioner are deactivated; and in the centralized energy device, each constituent element operates such that the refrigerant is circulated along the refrigerant line.

15. The heat pump system of claim 8, wherein:

when performing a low temperature dehumidification mode of the vehicle:

the branch line and the chiller connection line are opened through the operation of the first valve;

in the cooling apparatus, on the basis of the branch line, a portion of the coolant lines respectively connected to the radiator and the reservoir tank are closed, and the coolant passing through the electrical component circulates along the opened branch line and an opened portion of the coolant line without passage through the radiator through the operation of the first water pump;

the coolant introduced into the first valve through the branch line is introduced into the chiller along a portion of the battery coolant line connecting the chiller and the first valve;

the coolant passing through the chiller is introduced into the first valve along the opened chiller connection line, and then is circulated in the coolant line connected to the electrical component through the first valve;

the battery cooling apparatus is deactivated;

the coolant line and the heating line form independent closed circuits through the operation of the second valve, respectively;

in the heating apparatus, the coolant circulates along the heating line through the operation of the third water pump;

in the centralized energy device, each constituent element operates such that the refrigerant is circulated along the refrigerant line; and in the air conditioner, the coolant is circulated along the cooling line through an operation of the fourth water pump In a state in which the connection with the battery coolant line is closed.

16. The heat pump system of claim 7, wherein:

When performing a high temperature dehumidification mode of the vehicle:

the branch line and the chiller connection line are closed through the operation of the first valve;

in the cooling apparatus, the coolant is circulated in the coolant line by the operation of the first water pump;

the battery coolant apparatus is deactivated;

in the heating apparatus, the coolant line and the heating line are connected through an operation of the second valve such that the coolant is supplied from the cooling apparatus, and the coolant is circulated along the heating line through an operation of the third water pump;

in the centralized energy device, each constituent element operates such that the refrigerant is circulated along the refrigerant line; and in the air conditioner, the coolant is circulated along the cooling line through an operation of the fourth water pump In a state in which the connection with the battery coolant line is closed.

17. The heat pump system of claim 1, wherein:

when cooling the electrical component and the battery module by using the coolant:

the branch line is closed through the operation of the first valve;

the chiller connection line is opened through the operation of the first valve;

a portion of the battery coolant line connecting the chiller and the first valve is closed through the operation of the first valve;

the coolant line connecting the reservoir tank and the first valve is connected to the battery coolant line through the operation of the first valve;

the coolant cooled in the radiator and stored in the reservoir tank is supplied to the electrical component through an operation of the first water pump;

the coolant cooled in the radiator passes through the battery module along the battery coolant line from the first valve through the operation of the first and second water pumps; and the coolant passing through the battery module is introduced from the chiller to the first valve along the opened chiller connection line, and then is supplied to the electrical component while flowing along the coolant line connected to the first water pump.

18. The heat pump system of claim 1, wherein:

when using the waste heat of the electrical component without an operation of the centralized energy device in the heating mode of the vehicle:

the branch line and the chiller connection line are opened through the operation of the first valve;

in the cooling apparatus, on the basis of the branch line, the coolant line connected to the radiator, the reservoir tank, and the first valve are closed;

the battery coolant line except for the battery coolant line connected to the chiller is closed through the operation of the first valve;

in the heating apparatus, the heating line is connected to the coolant line through the operation of the second valve;

the coolant having the temperature that has risen while passing through the electrical component by the operation of the first water pump is supplied to the heating line connected to the opened coolant line without passing through the radiator;

the coolant introduced into the heating line is supplied to the heater through the operation of the third water pump;

the coolant discharged from the heater is introduced into the first valve along the opened coolant line and the opened branch line;

the coolant introduced into the first valve is again introduced into the first valve along the opened chiller connection line after passing through the chiller along the opened portion of the battery coolant line; and the coolant again introduced into the first valve is supplied to the electrical component along the opened the coolant line.

19. The heat pump system of claim 1, wherein:

the reservoir tank is provided in the coolant line between the radiator and the first valve, and is connected to the coolant line connecting the first valve and the first water pump through the supply line, and the supply line is connected to the coolant line, when the coolant is circulated to the coolant line by the operation of the first water pump.

20. The heat pump system of claim 1, wherein:

the battery cooling apparatus further includes a first coolant heater provided in the battery coolant line between the battery module and the chiller, the first coolant heater is operated to heat the coolant supplied to the battery module along the battery coolant line, when the battery module is heated, the heating apparatus further includes a second coolant heater provided on the heating line between the third water pump and the heater, and the second coolant heater is operated when a temperature of the coolant supplied to the heater is lower than the target temperature.

* * * * *